United States Patent
Varshneya et al.

(10) Patent No.: US 7,983,565 B2
(45) Date of Patent: *Jul. 19, 2011

(54) INTEGRATED OPTICAL COMMUNICATION AND RANGE FINDING SYSTEM AND APPLICATION THEREOF

(75) Inventors: Deepak Varshneya, San Diego, CA (US); John Roes, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/332,200

(22) Filed: Dec. 10, 2008

(65) Prior Publication Data

US 2009/0245788 A1 Oct. 1, 2009

Related U.S. Application Data

(63) Continuation of application No. 10/462,006, filed on Jun. 13, 2003, now Pat. No. 7,489,865, which is a continuation-in-part of application No. 10/066,099, filed on Feb. 1, 2002, now Pat. No. 7,308,202.

(51) Int. Cl.
*H04B 10/00* (2006.01)
*H04B 10/04* (2006.01)
(52) U.S. Cl. ........ 398/118; 398/183; 398/189; 398/190; 398/125; 398/128
(58) Field of Classification Search ................... 398/182, 398/183, 189, 190, 199, 118, 119, 125, 128
See application file for complete search history.

(56) References Cited

U.S. PATENT DOCUMENTS

| 3,989,942 A | 11/1976 | Waddoups |
| 4,054,794 A | 10/1977 | Laughlin et al. |
| 4,136,956 A * | 1/1979 | Eichweber .................... 356/153 |
| 4,143,263 A | 3/1979 | Eichweber |
| 4,249,265 A | 2/1981 | Coester |
| 4,731,879 A * | 3/1988 | Sepp et al. ....................... 342/45 |
| 4,847,481 A * | 7/1989 | Altmann ................... 250/206.1 |
| 4,866,781 A | 9/1989 | Borken et al. |

(Continued)

FOREIGN PATENT DOCUMENTS

EP    1154532 A    11/2001

(Continued)

OTHER PUBLICATIONS

EP supplemental search report mailed Mar. 20, 2009; Application 08020275-2220, 7 pages.

(Continued)

*Primary Examiner* — Dalzid Singh
(74) *Attorney, Agent, or Firm* — Kilpatrick Townsend & Stockton LLP

(57) ABSTRACT

The present invention is directed toward systems for conducting laser range and enabling optical communication between a plurality of entities and to the application of such systems in a secure covert combat identification system. In one embodiment, the present invention uses a novel laser system that generates high pulse rates, as required for optical communications, while concurrently generating sufficiently high power levels, as required by laser range finding operations. One application of the present invention is in enabling secure covert communications between a plurality of parties. Another application of the present invention is in tracking and identifying the movement of objects.

17 Claims, 21 Drawing Sheets

U.S. PATENT DOCUMENTS

| | | | |
|---|---|---|---|
| 4,937,795 A | | 6/1990 | Motegi et al. |
| 5,142,288 A | | 8/1992 | Cleveland |
| 5,166,507 A | * | 11/1992 | Davis et al. ............... 250/201.9 |
| 5,241,314 A | | 8/1993 | Keeler et al. |
| 5,274,379 A | * | 12/1993 | Carbonneau et al. ........... 342/45 |
| 5,299,227 A | | 3/1994 | Rose |
| 5,329,467 A | * | 7/1994 | Nagamune et al. ........... 702/159 |
| 5,426,295 A | | 6/1995 | Parikh et al. |
| 5,448,045 A | | 9/1995 | Clark |
| 5,448,847 A | | 9/1995 | Teetzel |
| 5,459,470 A | | 10/1995 | Wootton et al. |
| 5,476,385 A | | 12/1995 | Parikh et al. |
| 5,648,862 A | | 7/1997 | Owen |
| 5,686,722 A | | 11/1997 | Dubois et al. |
| 5,819,164 A | | 10/1998 | Sun et al. |
| 5,870,215 A | | 2/1999 | Milano et al. |
| 5,966,226 A | | 10/1999 | Gerber |
| 5,966,227 A | | 10/1999 | Dubois et al. |
| 5,978,141 A | | 11/1999 | Karwacki |
| 5,986,790 A | | 11/1999 | Ota et al. |
| 6,097,330 A | | 8/2000 | Kiser |
| 6,154,299 A | | 11/2000 | Gilbreath et al. |
| 6,219,596 B1 | * | 4/2001 | Fukae et al. .................... 701/23 |
| 6,239,901 B1 | | 5/2001 | Kaneko |
| 6,450,816 B1 | * | 9/2002 | Gerber ........................... 434/11 |
| 7,308,202 B2 | | 12/2007 | Roes et al. |
| 7,489,865 B2 | * | 2/2009 | Varshneya et al. .............. 398/33 |
| 2001/0017724 A1 | * | 8/2001 | Miyamoto et al. ............ 359/158 |
| 2001/0035995 A1 | | 11/2001 | Ruggiero |
| 2002/0089729 A1 | | 7/2002 | Holcombe |
| 2003/0072343 A1 | | 4/2003 | Murray et al. |
| 2004/0075880 A1 | | 4/2004 | Pepper et al. |

FOREIGN PATENT DOCUMENTS

| | | | |
|---|---|---|---|
| EP | 1286440 A | 2/2003 | |
| FR | 2681143 A | 3/1993 | |

OTHER PUBLICATIONS

EP supplemental search report mailed Mar. 23, 2009; Application 08020276.5-2220, 11 pages.

* cited by examiner

INTEGRATED OPTICAL COMMUNICATION AND RANGE FINDING SYSTEM AND APPLICATION THEREOF

CROSS-REFERENCES TO RELATED APPLICATIONS

This invention is a continuation of application Ser. No. 10/462,006 filed on Jun. 13, 2003, which is a continuation-in-part of application Ser. No. 10/066,099, now U.S. Pat. No. 7,308,202.

FIELD OF THE INVENTION

The present invention relates to optical systems, and, more specifically, to systems for conducting laser range and enabling optical communication between a plurality of entities and to the application of such systems in secure covert combat identification systems and object tracking systems.

BACKGROUND OF THE INVENTION

For various applications, including surveying, engaging in combat, and tracking objects, it is often necessary to determine the distance of remotely located objects and to communicate with a third party that may be proximate to the remotely located object. Conventionally, such functionality has been achieved using two separate systems that have been either physically combined into a single operating unit or separately provided into two physically distinct operating units.

For example, one approach to determining a distance to a remote object is to measure the time of flight of a pulse of light from the measuring system to the object and back again, and, subsequently, to calculate the distance to the object based upon the speed of light and differences in the transmitted and received light. Systems employing this method typically employ a laser to generate the light pulse and are known generically as "laser range finders" (LRFs) or "light detection and ranging" (LiDAR) systems.

The accuracy and resolution of a LRF system, along with the maximum range that can be dependably measured by such systems, are dependent on a plurality of factors. For example, the laser pulses received after reflection from a target comprise a replica of the transmitted laser pulse signals along with undesirable signals or noise making it difficult to detect the signals of interest. Further, the laser pulses transmitted and received after reflection from the target undergo significant attenuation due to factors such as the nature of the surface of reflection of the target, atmospheric conditions and the distance of the target from the ranging system. Typically, LRF systems optimize operational efficiency by using high powered lasers, such as YAG solid state lasers, that transmit using intermittent pulses of high power, such pulses often being separated by a minimum recharge period of several milliseconds.

Data communications may be enabled by numerous devices and systems, from satellite transceivers, to mobile phones, to conventional PSTN connections, to packet-based network communications. Applications that require a high degree of data security and must operate in situations and locations that may not have a reliable, or even an existent, telecommunications infrastructure have conventionally relied on some form of point to point optical communication. Such systems use a optical transmitter, such as a laser, in combination with a retroreflector to receive a laser transmission and modulate a return signal.

These conventional optical communication systems have substantial disadvantages, however. Because an optical communication system needs to achieve a sufficiently high data in order to be able to modulate, and therefore communicate, meaningful amount of data, these systems rely on lasers having different operational characteristics, as compared to lasers conventionally used in LRF systems. Specifically, conventional optical communication systems use lower power, higher pulse rate lasers that require a fraction of the recharge required by higher power lasers. Consequently, such systems can not be integrated with conventional laser range finding systems.

Additionally, high data communication rate requires responsive retroreflectors in order to enable a sufficiently modulation rate. Without a sufficiently responsive retroreflector, high modulation rates can not be achieved and, consequently, high data communication rates can not be effectuated, even if the appropriate laser system is utilized. U.S. Pat. No. 4,887,310 discusses identification devices having means for modulating a reflected laser beam at the target. However, the disclosed systems are very expensive and not sufficiently sensitive. U.S. Pat. No. 4,134,008 discloses a method for transmitting a response code to an interrogation received at the location of the retroreflector. Kerr or Pockels cells, or PLZT ceramics (lead-lanthanum-zirconium-titanium), are used in the above-mentioned system for modulating the retroreflector signal. These modulators require high operating voltages and either very costly or allow for a relatively low modulation frequency.

In light of the abovementioned disadvantages, there is a for an integrated optical communication system facilitating remote data communications and for a laser range finding system for determining the distance of a remote object. There is also a need for enabling the use of a single laser system for both laser range finding and optical communications. Furthermore, there is a need for retroreflector systems, and methods of use, that enable the sufficiently fast modulation of a data signal.

There is also a need to have an integrated laser range finding and data communication system adapted for use in military operations, particularly in secure covert operations. Military forces have an interest in the remote and secure identification of a person, during combat training exercises and in armed conflicts, and in the tracking and identification of objects. Identification as friend or foe (IFF) systems are well-known in the art for military aircraft and other weapons systems. Such systems are useful for preventing action against friendly forces. The military platform commanders on a modern battlefield must accurately identify potential targets as friend-or-foe (IFF) when detected within range of available weapon systems. Such target IFF presents a difficult decision for a military platform commander, who must decide whether to engage a detected target while avoiding accidental fratricide. This problem is even more difficult for the dismounted soldier who may be moving covertly through an unknown combat zone at night with limited visibility. Simple visual assessments of other dismounted soldiers is not a reliable IFF method for military platforms or dismounted infantry.

The art is replete with proposals for IFF systems for military platforms in modern land battlefields. But commanders often still rely on low-resolution visual and infrared images to identify detected targets. Commanders often must operate under radio silence to avoid detection by an enemy. With infrared (IR) imagers alone, the identification of individual dismounted soldiers is not feasible, although the IR signatures of land vehicles may have some use. IFF systems that require one or more radio signals are limited in channel-capacity and must bear the overhead of selecting and/or awaiting an available battlefield channel before completing the IFF task. Active-response systems require the emission of a signal by the unknown respondent in response to a verified challenge, which may compromise the security of both interrogator and respondent. Active transponders are subject to capture and may be used for spoofing by the enemy in a battlefield or a combat training environment. Passive response systems rely on the return of an echo (reflection) of a challenge signal to the interrogator, but simple reflection schemes are easily compromised and more elaborate passive reflection schemes are still subject to intercept, compromise or capture for use by the enemy in spoofing the interrogator.

As described in U.S. Pat. No. 4,851,849 by Otto Albersdoerfer, a typical active IFF technique for vehicles is to equip a military vehicle with a transponder that emits a coded return signal when an interrogating radar pulse is detected by its receiver. As described in U.S. Pat. No. 5,686,722 by Dobois et al., a more sophisticated active IFF technique for vehicles uses a selective wavelength optical coding system with tunable optical beacons mounted on each vehicle. By spreading the optical broadcast energy into frequency in a precise manner, the beacon identifies the host vehicle to friendly receivers while remaining covert to the enemy.

As described in U.S. Pat. No. 4,694,297 by Alan Sewards, a typical passive IFF technique for vehicles is to equip a military vehicle with a passive antenna that reflects an interrogatory radar beam while adding a distinctive modulation by varying the antenna termination impedance responsive to evaluation of the interrogatory beam. A more sophisticated passive electro-optical IFF system for vehicles is described in U.S. Pat. No. 5,274,379 by R. Carbonneau et al., wherein each friendly vehicle is provided with a narrow-beam laser transmitter and a panoramic detector. If a vehicle detects a coded interrogator laser beam and identifies the code as friendly, it opens a blocked rotating retroreflector to clear a reflection path back to the source, where it can be identified by another narrow field-of-view detector. A further modulation is also added to the reflected beam to identify the reflecting vehicle as friendly. If an improperly coded beam is detected, the transmission path is not cleared, thereby preventing reflection of that beam and warning is sent to the vehicle commander of an unfriendly laser transmission. Others have proposed similar passive optical IFF systems for vehicles, including Wooton et al. in U.S. Pat. No. 5,459,470 and Sun et al. in U.S. Pat. No. 5,819,164.

The art is less populated with IFF proposals for the lone dismounted soldier (the infantryman on foot). Whether in actual combat or in a training exercise, the dismounted soldier operates with severe weight limits and little onboard electrical power. The friendly foot soldier has no distinctive acoustic, thermal or radar cross-section that may be used to assist in distinguishing friendlies from enemies. But some practitioners have proposing IFF solutions for the dismounted soldier, both active and passive. For example, in U.S. Pat. No. 6,097,330, Kiser proposes an active IFF system for identifying concentrations of ground troops (or individuals) from an aircraft by interrogating a (heavy) human-mounted radio transmitter carried by one of the group with a narrow-cast optical signal. As another example, in U.S. Pat. No. 5,299,277, Rose proposes a compact active IFF system to be carried by each individual dismounted soldier for use in combat exercises or on the battlefield. The system includes a clip-on beacon and a hand-held (flashlight-style) or weapon-mounted detector. The beacon radiates a spread-spectrum low-probability-of-intercept (LPI) signal at optical frequencies that are selected to be invisible to the usual detectors present in the battlefield. Rose doesn't consider the problem of spoofing with captured devices. As yet another example, in U.S. Pat. No. 5,648,862, Owen proposes an active IFF system implemented by adding provisions for coded two-way transmissions to the night-vision systems often worn by dismounted soldiers. As a final example, in U.S. Pat. No. 5,966,226, Gerber proposes an active combat IFF system for each dismounted soldier that includes a weapon-mounted laser projector for interrogating suspected targets and a harness including means for receiving the interrogatory signal and means for responding with an encoded radio, acoustic or optical signal.

These proposals do not resolve, however, the spoofing problem (through capture of a beacon or harness, for example); and are not particularly covert because the responding target generally broadcasts an active signal either continuously or in response to interrogation. Any IFF proposal employing broadcast signals also faces a battlefield channel capacity (or channel ability delay) problem as well. Furthermore, these proposals do not address the need to be able to actually communicate with a target to verbally identify the individual as a friend or foe.

There is still a need in the art for a secure cover system (SCS) for that provides true passive covertness and that cannot be spoofed under any battlefield conditions. The desired SCS system requires little power and is adapted to prevent any use of captured equipment or intercepted signal codes. Furthermore, the desired SCS system is capable of enabling both range finding an optical communication functionality in the lightest weight configuration possible. Finally, the system should be inexpensive enough to permit equipping every soldier with the necessary interrogation and response equipment for combat exercises or actual battlefield conditions.

These unresolved problems and deficiencies are clearly felt in the art and are solved by this invention in the manner described below.

SUMMARY OF THE INVENTION

The present invention is directed toward systems for conducting laser range and enabling optical communication between a plurality of entities and to the application of such systems in a secure covert combat identification system. In one embodiment, the present invention comprises a laser system for determining range values and enabling communications between a plurality of parties, comprising a laser for generating a plurality of transmission pulses wherein said laser is activated by a first party; an optical transmission system for directing the transmission pulses emitted by the laser on to a target object wherein said transmission pulses are reflected by the target object to create reflected signals, an optical reception system for receiving said reflected signals; and a processor for deriving range data and communication data from said reflected signals.

Optionally, the communication data includes any one of audio, video, text, or image data. The optical transmission further comprises a collimator. The laser is a fast pulsed laser, wherein the laser is any one of a mode-locked visible-range titanium-doped sapphire laser, Kerr lens mode-locked laser, polarization-sensitive mode-locked fiber laser, or actively mode-locked laser. Preferably, the laser is a master oscillator power amplifier device and further comprises an optical amplifier medium, preferably being an erbium-doped fiber amplifier.

Optionally, the optical reception system comprises an analog board, an APD receiver module, a receiver lens, a filter assembly, and a receiver aperture into which the reflected signals are received. Optionally, range data is displayed on a range display. Optionally, the laser system of claim 1 further comprising a light sensitive detector, a change-over module, and a correlator module. Optionally, the correlator module comprises a memory for storing a plurality of coded pulse sequences for triggering the laser, and for storing the reflected signals, wherein said reflected signals are digitized by an analog-to-digital converter coupled to the reception system, and a processor for calculating a range of the target object by correlating the reflected signals with the transmitted pulses and estimating a time delay of the reflected signals at which the correlation between the transmitted pulses and reflected signals is maximum.

Optionally, the processor further calculates best lines-of-fit for a predetermined number of sample points before and after a maximum point of correlation to determine a revised maxima. Optionally, the laser is triggered by coded pulse sequences read out from a memory at a predetermined clock frequency. Optionally, the coded pulse sequence for triggering the laser is of a pseudo random binary type. Optionally, the coded pulse sequence for triggering the laser is encoded using a Maximal Length Sequence.

In another embodiment, a method of the present invention comprises the steps of generating transmission pulses at fast rates by triggering a laser using coded pulse sequences read out from a memory at a predetermined clock frequency, storing the coded pulse sequences for triggering the laser, directing the transmission pulses on to the target object, receiving the reflected pulses from the target object, digitizing the received reflected pulses, storing the digitized reflected pulses, and calculating the range of the target object by correlating the reflected pulses with the transmitted pulses and estimating a time delay of the reflected pulses at which a correlation between the transmitted and reflected pulses is maximum.

In another embodiment, a method of the present invention comprises the steps of generating transmission pulses at fast rates by triggering a laser using coded pulse sequences read out from a memory at a predetermined clock frequency, modulating a signal onto said transmission pulses, directing the transmission pulses from the first entity to the second entity, receiving the transmission pulses at a plurality of retroreflectors proximate to the second entity, modulating a response onto reflected signals, receiving said reflected signals, and extracting range data and communication data from said reflected signals.

Optionally, the retroreflector comprises any one of a polymer dispersed liquid crystal, a ferro-based liquid crystal, a micro-electrical-mechanical system, or multiple quantum wells. Optionally, the retroreflector is heated upon activation by a transmission pulse.

In another embodiment, a method of the present invention comprises the steps of generating transmission pulses at fast rates by triggering a user using coded pulse sequences read out from a memory at a predetermined clock frequency, modulating a transmit code onto said transmission pulses, directing the transmission pulses from the first entity to the second entity, receiving the transmission pulses at a plurality of retroreflectors proximate to the second entity, modulating a response code onto reflected signals, receiving said reflected signals, and extracting range data and code data from said reflected signals.

In another embodiment, the present invention includes a laser system for determining range values and enabling communications between a plurality of parties. The laser system comprises a laser for generating a plurality of transmission pulses, an optical transmission system for directing the transmission pulses emitted by the laser on to a target object wherein said transmission pulses are reflected by the target object to create reflected signals, an optical reception system for receiving said reflected signals, and a processor for deriving range data and communication data from said reflected signals wherein said reflected signals are subjected to an autocorrelation function.

In another embodiment, a method of the present invention comprises the steps of generating a plurality of transmission pulses using a fast pulsed laser, directing the transmission pulses emitted by the laser on to a retroreflector wherein said transmission pulses are reflected by the retroreflector to create reflected signals, receiving said reflected signals, and processing range data and communication data from said reflected signals wherein said reflected signals are subjected to an autocorrelation function.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DETAILED DESCRIPTION OF THE INVENTION

The present invention is directed toward systems for conducting laser range and enabling optical communication between a plurality of entities and to the application of such systems in a secure covert combat identification system. In one embodiment, the present invention uses a novel laser system that generates high pulse rates, as required for optical communications, while concurrently generating sufficiently high power levels, as required by laser range finding operations. One application of the present invention is in enabling secure covert communications between a plurality of parties. Another application of the present invention is in tracking and identifying the movement of objects. The present invention will be described with reference to aforementioned drawings. One of ordinary skill in the art would appreciate that the applications described herein are examples of how the broader concept can be applied.

Integrated Laser Range Finding and Optical Communications

Figure 1:
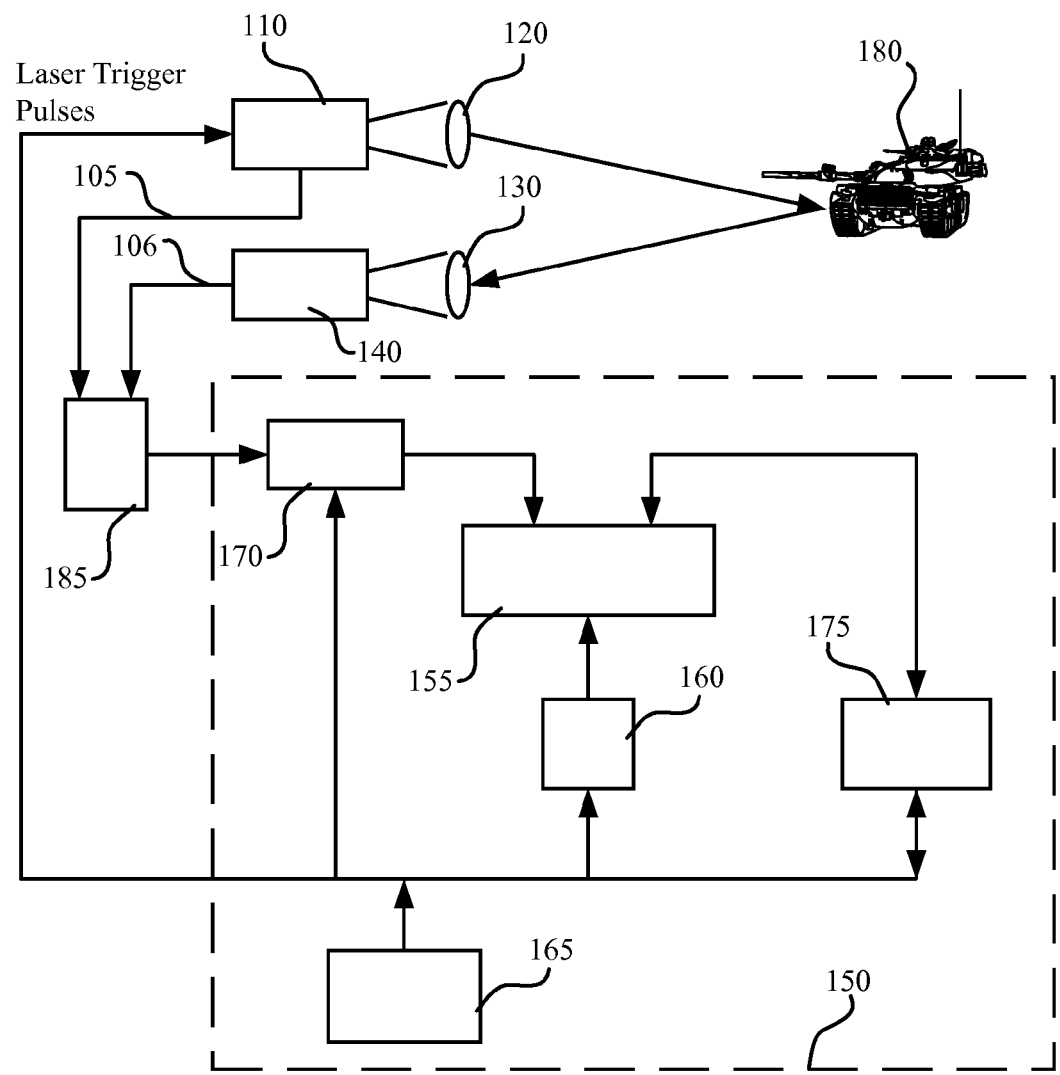
FIG. 1 is a flowchart depicting one embodiment of the laser range finding system of the present invention.

Referring to FIG. 1, a functional block diagram of a laser system 100 of the present invention, when operating as a range-finder, is shown. The laser system comprises a laser 110, an optical transmitter 120, an optical receiver 130, a light, sensitive detector 140, a change-over and a correlator module 150. The correlator module 150 further comprises a clock signal generator 165 that provides working clock signals to an analog-to-digital converter 170, a counter 160 for addressing and sequencing a memory module 155 and a processing unit 175. The memory module 155 stores digitized values of a sequence of transmission pulses s(t), for triggering the laser 110, as well as reception pulses r(t) outputted from the detector 140 and digitized by the analog-to-digital converter 170.

The laser 110 is a source of short pulses of electromagnetic energy. The laser is preferably driven by an ultra-fast pulsed laser oscillator such as a mode-locked visible-range titanium-doped sapphire laser, Kerr lens mode-locked lasers, polarization-sensitive mode-locked fiber lasers, actively mode-locked lasers or any other suitable laser source known to persons of ordinary skill in the art. In one preferred embodiment, the laser source 110 is a master oscillator power amplifier (MOPA) device comprising a master oscillator (MO) semiconductor laser diode having an output facet optically coupled to or formed integral with an optical power amplifier (OPA). A monolithic MOPA device has been described in U.S. Pat. No. 4,744,089 to Montroll et al. and is hereby incorporated by reference.

In a preferred embodiment, rare earth elements (example, erbium) in an optical amplifier medium or a rare earth-doped fiber section (example, an erbium-doped fiber amplifier also termed as EDFA) are excited by a pump light source using a laser diode, so that a signal light coming into the EDFA section causes induced emission by the excited rare earth element. Such an EDFA based system has been described in U.S. Pat. No. 6,064,514 to Aoki et al. and is also hereby incorporated by reference.

Figure 4:
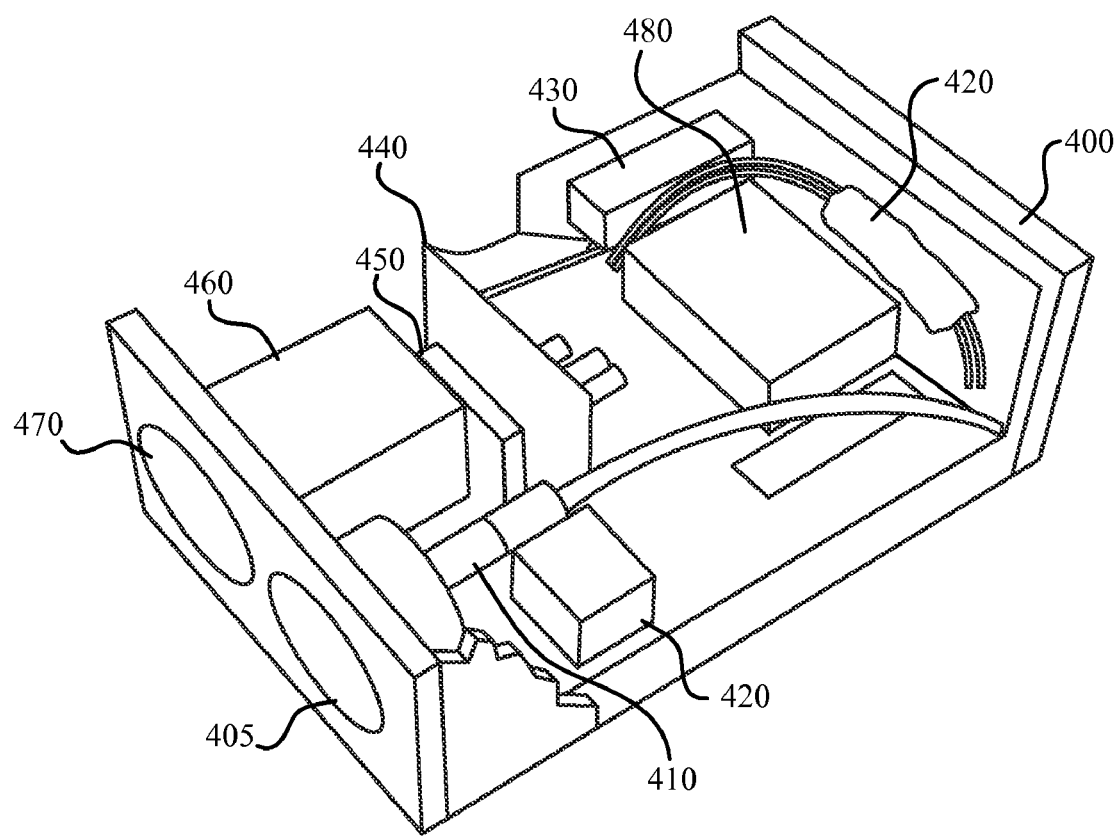
FIG. 4 is a visual representation of an assembly of one embodiment of the laser range finding system of the present invention.

Referring to FIG. 4, a visual representation of one embodiment of a laser range finding system 420 is shown. A laser emits optical signals through a collimator 410 which collimates the beam for subsequent transmission through a laser aperture 405. Power is supplied to the unit by battery 480. The system further comprises a HV supply 430, an analog board 440, an APD receiver module 450, a receiver lens and filter assembly 460 and a receiver aperture 470 into which reflected optical signals are received. The resulting range is depicted on a range display 420.

Figure 5:
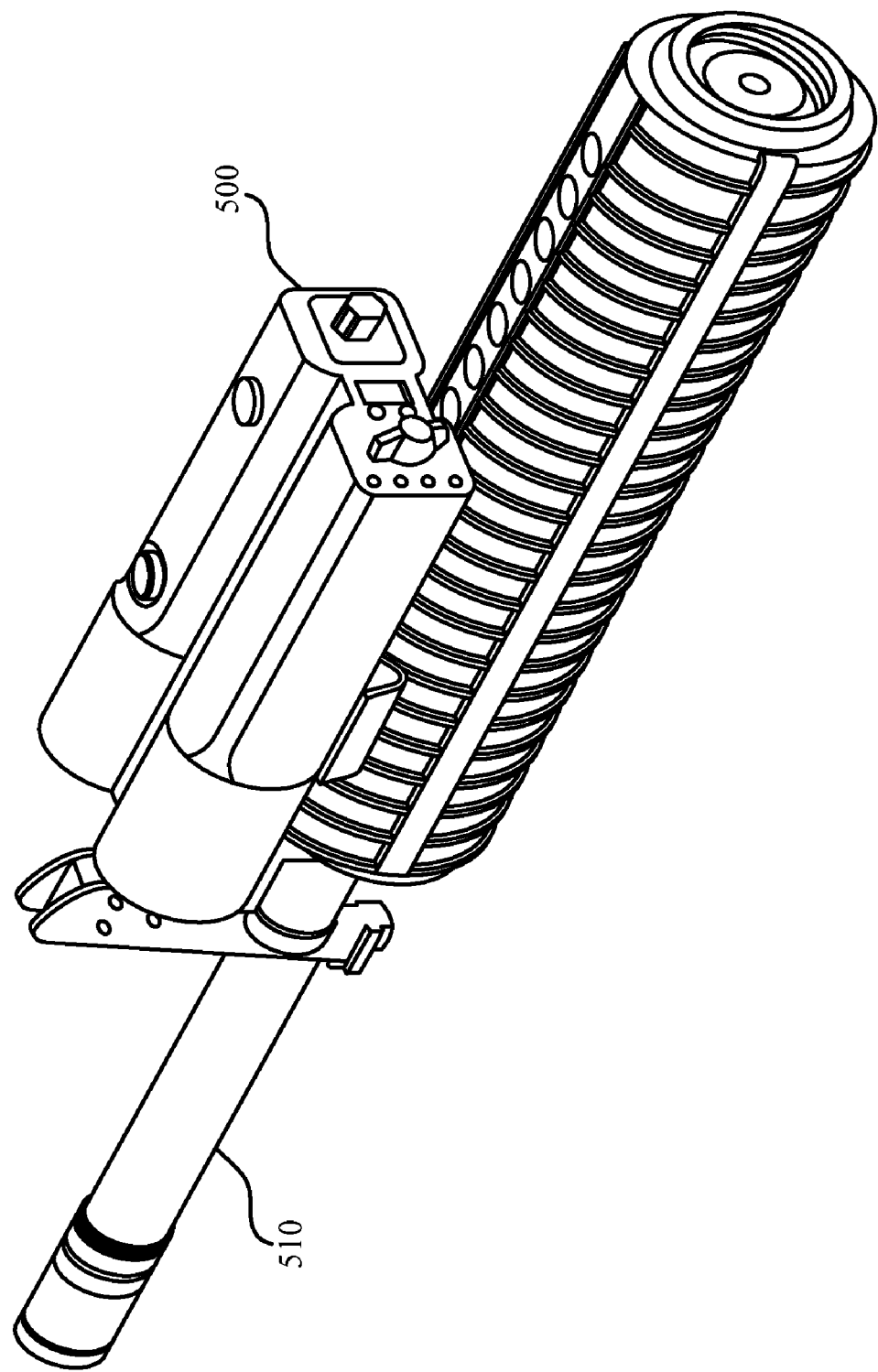
FIG. 5 is a view of one embodiment of a laser system of the present invention in physical communication with a weapon.

Laser system 100 of FIG. 1 may be built as stand alone hand held units or embodied in larger systems. The laser system may be incorporated into tanks, planes, vehicles, armored trucks, carrying cases, backpacks, hand-held weapons, guns, and other devices. For example, FIG. 5 shows a MOPA/EDFA-based LRF system 500 mounted upon a shotgun barrel SILO.

For range finding, the transmission pulse sequences s(t), stored in the memory module 155, are read out, using the counter 160, which is acted upon by the clock signal from the clock signal generator 165, and sent to the laser 110 causing the laser 110 to emit a pulse of light at time t0. This pulse of light is focused by the transmission optics 120 and travels to a target object 180 where it is reflected by a retroreflector/obturator (not shown).

The function of a retroreflector is to receive input electromagnetic energy and to reflect it back along the same or parallel path, preferably with similar general characteristics and preferably with relatively high gain and little spreading of the light beam. The receiving optics 130 collects a portion of the reflected light pulses and focuses them onto the light sensitive detector 140. The detector 140 converts the received light pulse into an electrical signal output at time t1 and amplifies the electrical signals, if necessary. These electrical signal outputs are supplied to the analog-to-digital converter 170 that generates corresponding sequence of digital values r(t) which are then stored in the memory module 155. The digital transmission and reception signals, s(t) and r(t), respectively, are communicated to the processor unit 175, which calculates and displays the range to the target object 180 based upon the time of flight of the laser pulse (t1-t0) and the speed of light c in the intervening medium.

The counter 160 and the analog-to-digital converter 170 are acted on synchronously by the clock signal such that whenever a digital value s(t) from the memory module 155 is read-out and transmitted by the transmission optics 120, the analog value delivered at the same instant from the detector 140 is converted into a digital value r(t) and stored in the memory module 155. Consequently, after one transmission and reception cycle, signals of substantially the same shape are present in the memory module 155 wherein the received signal r(t) is shifted in time relative to the transmitted signal s(t) by the time of flight (t1–t0) along the path of measurement, corresponding to a specific number of clock cycles.

The processor unit 175 derives the number of clock cycles corresponding to the time of flight (t1–t0) by calculating a correlation function k(t) between the transmission signals s(t) and the reception signals r(t), stored in the memory module 155. In accordance with the understanding of persons of ordinary skill in the art, the correlation function k(t) values are calculated, in each case, by summing the products of oppositely disposed supporting position values of the two signals, s(t) and r(t), respectively. Thereafter, the maximum Kmax=k (tmax) of the correlation function k(t) is determined where the tmax represents the time of flight at which the transmission and reception signals, s(t) and r(t), are time shifted relative to one another to an extent that their curves have a minimum spacing from one another or substantially overlap. This shift corresponds to the time of flight or the number of clock cycles that have elapsed between the transmission and reception signals s(t) and r(t), respectively. Since the reception signals r(t) are replicas of the transmission signals s(t) but delayed in time, persons of ordinary skill in the art would appreciate that the correlation operation between the two signals corresponds to a condition of autocorrelation.

In order to provide a distinct autocorrelation function values, the sequence of digitized transmission pulses s(t), stored in the memory module 155, are of the recurrent pulse type that may be channel-coded using Barker binary codes, pseudo-random codes, Gold or Kasami code or any other suitable code known in the art. In a preferred embodiment, the transmission pulses s(t) are encoded using a Maximal Length Sequence (MLS), which is a family of pseudo random binary signals typically generated using a digital shift register whose input is generated from appropriate feedback taps.

Figure 2A:
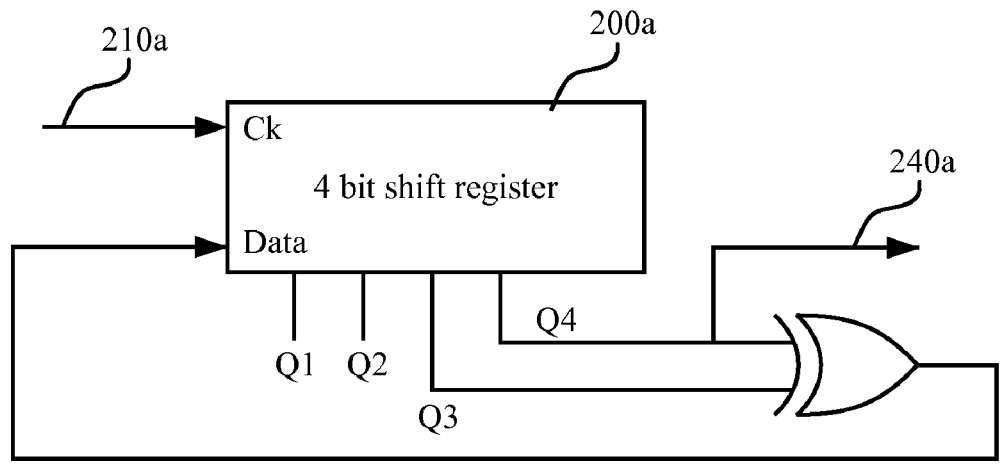
FIG. 2a is schematic of one embodiment of a circuit for the generation of a signal.
Figure 2B:
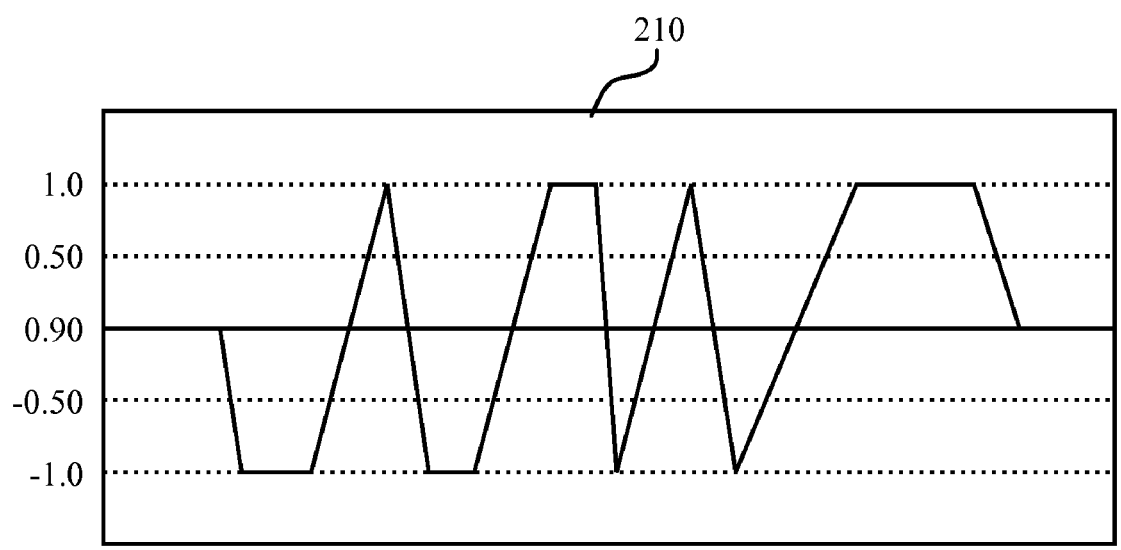
FIG. 2b is a chart of voltages for a plurality of received signals.

Alternatively and/or additionally, the MLS code pulses may be pulse position modulated for data transmission. The MLS has suitable autocorrelation properties and since the signal takes values of +1 and −1, the autocorrelation may be computed using additions and subtractions, without the need for multiplications. FIG. 2a shows an example of a MLS signal 240a generated by a four-stage shift register 200a that receives clock information from a clock source 210a and data. Alternative length sequences can be generated by using longer shift registers with appropriate feedback taps.

Figure 3:
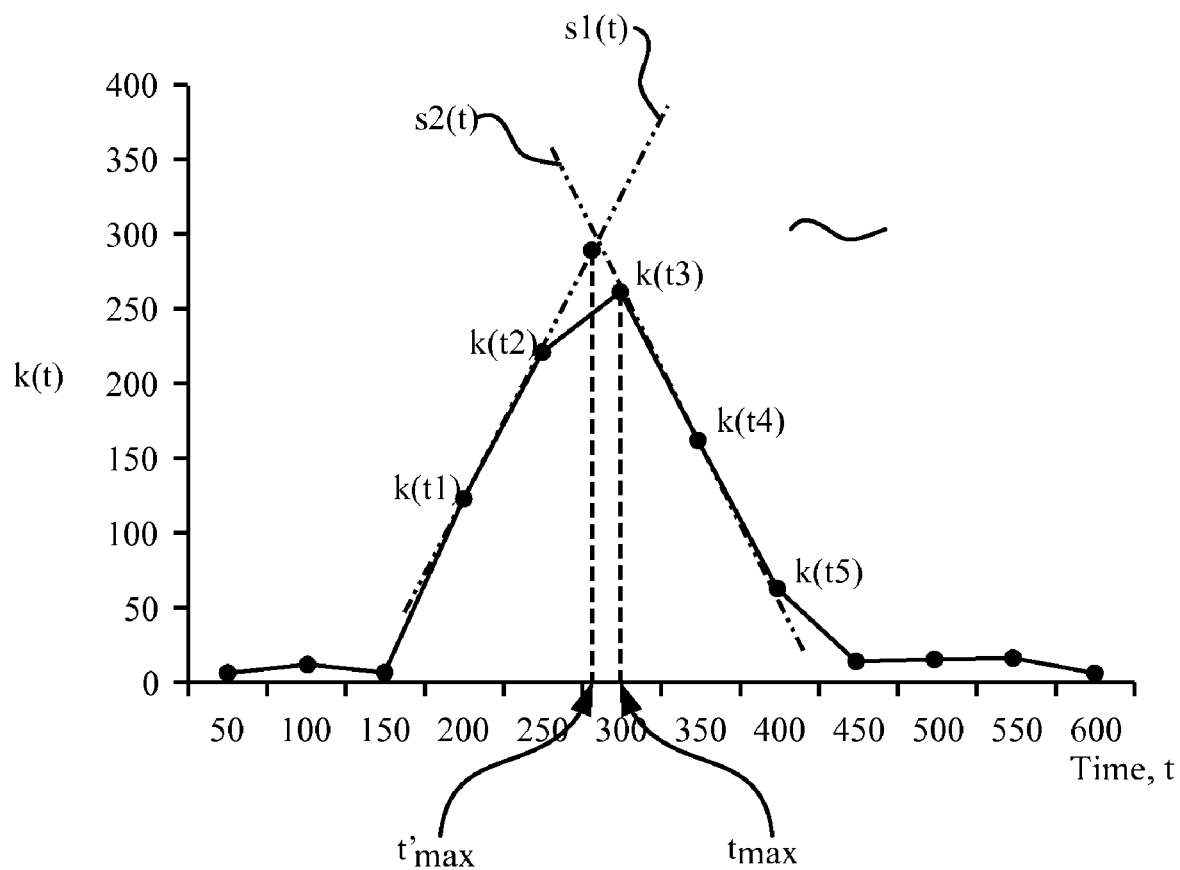
FIG. 3 is a chart of an exemplary calculated correlation between transmission and reception signals.

FIG. 3 shows a section from the calculated correlation function values k(t) between the transmission and reception signals s(t) and r(t), respectively. Five supporting values of the correlation function k(t) have been emphasized in FIG. 3, with the middle one of these five values representing the maximum tmax. In order to further improve the time resolution and obtain more accurate time of flight or lag-maxima tmax, the coefficients m1 and c1 for the best line-of-fit equation, s1(t)=m1·t+c1, are calculated (through a predetermined number of samples prior to the tmax value) along with the coefficients m2 and c2 for the best line-of-fit equation, s2(t)=m2·t+c2, through a predetermined number of samples after the tmax value. These lines of best fit are shown plotted on FIG. 3. The intersection value $t'_{max}$ can now be computed as:

$$t'_{max}=[(c2-c1)/(m1-m2)]$$

where $t'_{max}$ is a new time of flight value obtained at a higher resolution. The distance to the target object can be calculated from the determined $t'_{max}$; it is half the speed of light multiplied by the time-of-flight $t'_{max}$.

However, the calculated value of the time-of-flight $t'_{max}$ comprises the sum of the time-of-flight of light pulses transmitted and the signal transit time. The signal transit times represent measurement errors that can, for example, be eliminated by the use of a reference signal. Referring back to FIG. 1, a reference signal 105 as well as the reception signal r(t) 106 are shown as inputs to the changeover switch 185 for the selective coupling of the reference signal 105 and reception signal 106 to the correlator module 150. The changeover switch 185 has two switch positions, of which one is 'reference,' associated with the reference signal 105 and the other is 'normal' associated with the reception signal 106. When the switch position is 'normal,' the reception signals r(t) 106 are correlated with the original transmission signals s(t) in the correlator module 150 to determine the time-of-flight $t'_{max}$. However, when the switch position is 'reference,' the reference signals 105 are correlated with the transmission signals s(t) in the correlator module 150 thereby determining the signal transit time error $t_{error}$ within the LRF system 100. This transit time error $t_{error}$ can then be subtracted from the time-of-flight value $t'_{max}$ for error correction.

The present laser range finding system can also be used as an optical communication system. Conventionally, laser range finding systems employed lasers, such as YAG solid state lasers, having substantial recharge times, on the order of several milliseconds, in order to achieve the power levels required for effective laser range finding. With the novel approach described above, lasers having very high pulse rates, such as a MOPA/EDFA laser assembly, can be used to conduct laser range finding. Consequently, the same laser assembly can be used to generate the requisite pulse rate for data communications. The laser system, as shown in FIG. 1, therefore employs a modulation scheme to modulate the optical signal. As previously discussed, in one embodiment, pulses are pulse position modulated for data transmission.

To enable effective data communications, it is preferred that a retroreflector/obturator capable of rapid modulation is used. The present invention is not limited to a specific type of retroreflector/obturator and may employ any useful retroreflector device known in the art, such as, for example, a Tech Spec™ Corner Cube Retroreflector (Trihedral Prisms) available from Edmond Industrial Optics, Barrington, N.J. The obturator portion of retroreflector/obturator may include a mechanical shutter device capable of cycling open and closed within a few milliseconds, or more preferably, a liquid crystal device (LCD) disposed over the retroreflector portion, such as the LCD-CDS921 06 available from Cubic Defense Systems, San Diego, Calif.

However, it should be noted that, for the present invention, it is preferred that the selection of the retroreflector be tailored to the nature of the use. Specifically, the type of retroreflector used is largely dependent on the speed of the required modulation.

A variety of devices utilizing both "solid state" and "soft" materials are in use for deflecting or switching optical beams. Solid-state devices for steering or high-speed modulation of light use acousto-optic beam deflection, non-linear optical crystals, or optically pumped carrier shifting in semiconductors. Soft materials are preferably used as they offer the advantages of low power consumption and low cost processing methods such as ink jet deposition, micro contact printing, and self-assembly. Soft devices employ electro-optic polymers, liquid crystals, and micro-structured composites such as polymer-dispersed liquid crystals and nematic displays.

Polymer dispersed liquid crystals (PDLC) operate on the principle of electrically controllable light scattering. These materials are combined application of polymers and liquid crystals, which do not require polarizers for its operation unlike nematic displays, thus making them more transparent with minimum loss of light.

PDLCs consist of liquid crystal droplets that are dispersed in a solid polymer matrix. The resulting material is a polymer matrix with liquid crystal droplets filling in the holes. By changing the orientation of the liquid crystal molecules with an electric field, it is possible to vary the intensity of the transmitted light.

Figure 6:
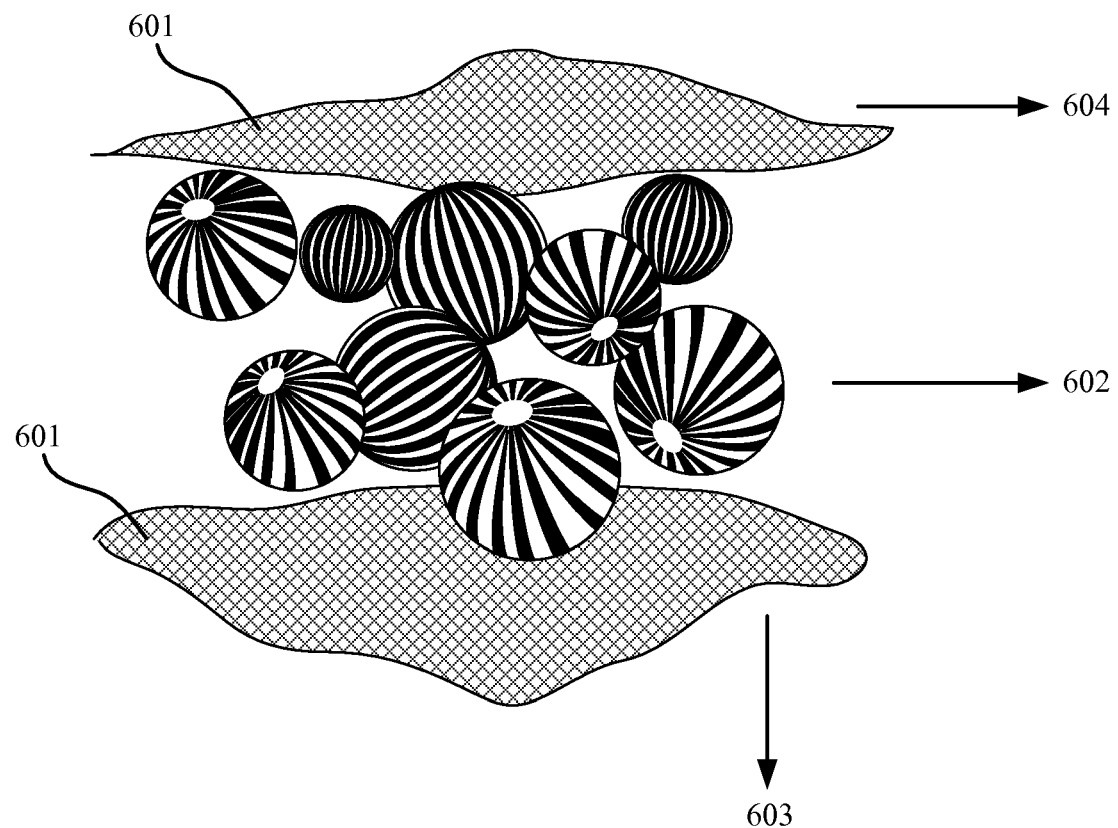
FIG. 6 is a schematic diagram of an exemplary polymer-dispersed liquid crystal cell.

While manufacturing a polymer dispersed liquid crystal shutter, a fluid monomer (epoxy resin) and fluid-curing agent (hardener) are mixed together with a liquid crystal. As the polymerization proceeds the liquid crystal phase separates from the polymer. The mixture hardens (polymerizes) and locks in nearly spherical droplets of liquid crystal within the polymer binder. The arrangement of the liquid crystal molecules within these droplets depends primarily on the kind of polymer used and on the size of the droplet. Referring to FIG. 6, a schematic diagram of the polymer-dispersed liquid crystal cell is depicted. The polymer-dispersed liquid crystal cell comprises of two or more plates 601 stacked and separated from one another by means of liquid crystal 602 dispersed in a polymer matrix 603. The plates 601 can be of any transparent material including plastic and glass. The plates are coated with conducting and transparent electrodes 604.

Figure 7:
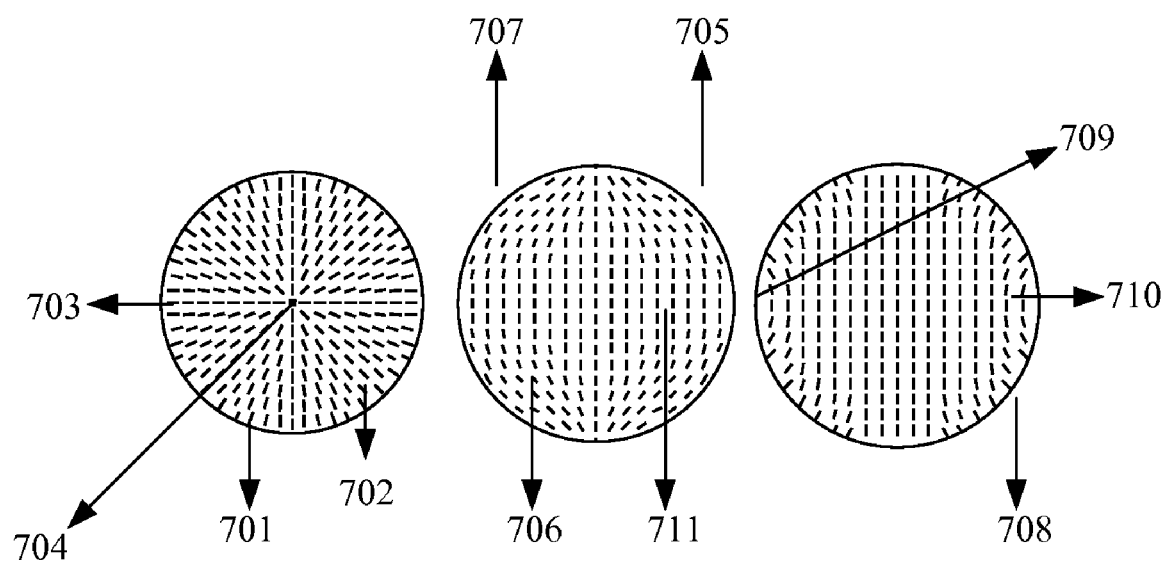
FIG. 7 depicts a plurality of configurations of a liquid crystal based retroreflector.

Referring to FIG. 7, a plurality of configurations of liquid crystal molecules, depicting open and closed optical states, is shown. Many different configurations have been observed and they depend on factors such as droplet size and shape, surface anchoring, and applied fields. A closed state may occur when the liquid crystal molecules 702 are anchored with their long axes perpendicular to the droplet walls 703 with the point defect 704 in the centre of the droplet a radial configuration 701. A closed state may occur when the molecules are oriented perpendicular to the droplet wall 707, when there is weak surface anchoring (axial configuration 705). This configuration results in a line defect 711 that runs around the equator of the spherical droplet. When an electric field (not shown) is applied to a radial droplet 701, the molecules adopt the axial configuration 705. The radial configuration 701 is returned when the field is removed.

A semi-open, semi-closed state may occur with a bipolar configuration 708, which is obtained by tangential anchoring of the liquid crystal molecules. This creates two point defects 709, 710 at the poles of the droplet.

Figure 8:
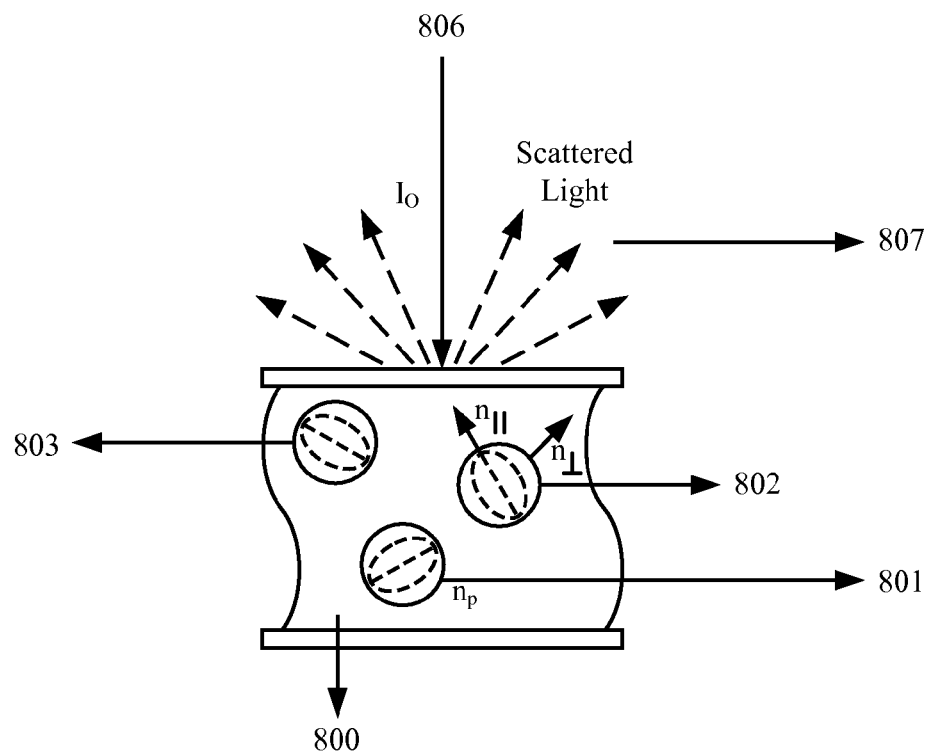
FIG. 8 depicts a plurality of alignment states in an exemplary liquid crystal sample.
Figure 8:
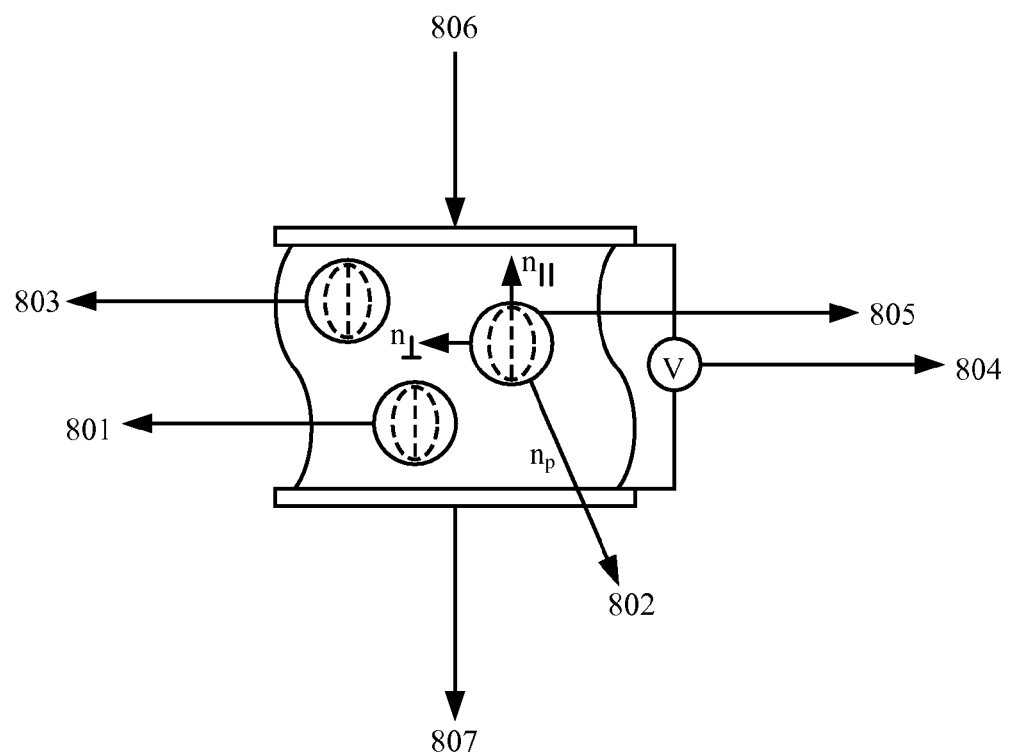

Referring to FIG. 8, a typical polymer dispersed liquid crystal sample is depicted. The PDLC comprises of plurality of droplets 801, 802, 803 with different configurations and orientations, i.e., the symmetry axes of these droplets are random. However, when an electric field 804 is applied the molecules within the droplets 801, 802, 803 align along the field 804 and have corresponding optical properties. The lines 805 on the droplet represent the directed orientation.

Unpolarized light 806 entering the polymer-dispersed liquid crystal at normal incidence to the surface interacts with the droplets 801, 802, 803 oriented parallel and perpendicular to the incoming light, as well as angles in between. Since the symmetry axes are random, it is not possible for all the index of refractions to be similar. Due to the change in index of refraction as light traverses the crystal, the incoming light is scattered 807 by most droplets and the PDLC appears opaque. This property of polymer-dispersed liquid crystal is put to use while employing it as a shutter/obturator.

Conversely, on application of electric field 804 the droplets 801, 802, 803 in the polymer-dispersed liquid crystal 800 rotate such that their symmetry axes are aligned parallel to the field. The ordinary index of refraction is matched to the refractive index of the matrix so that in a field ON state the light signals 806 experience the similar index of refractions that makes the crystal appear transparent and the light 807 is found at the other end of the crystal. Upon removing the field, the droplets 801, 802, 803 revert back to their random orientation and the display is again opaque. This functionality of opening (transparency) and closing (opaqueness) of polymer-dispersed liquid crystal makes it one of the preferred obturator/modulator types for optical communication system of the present invention.

Figure 9:
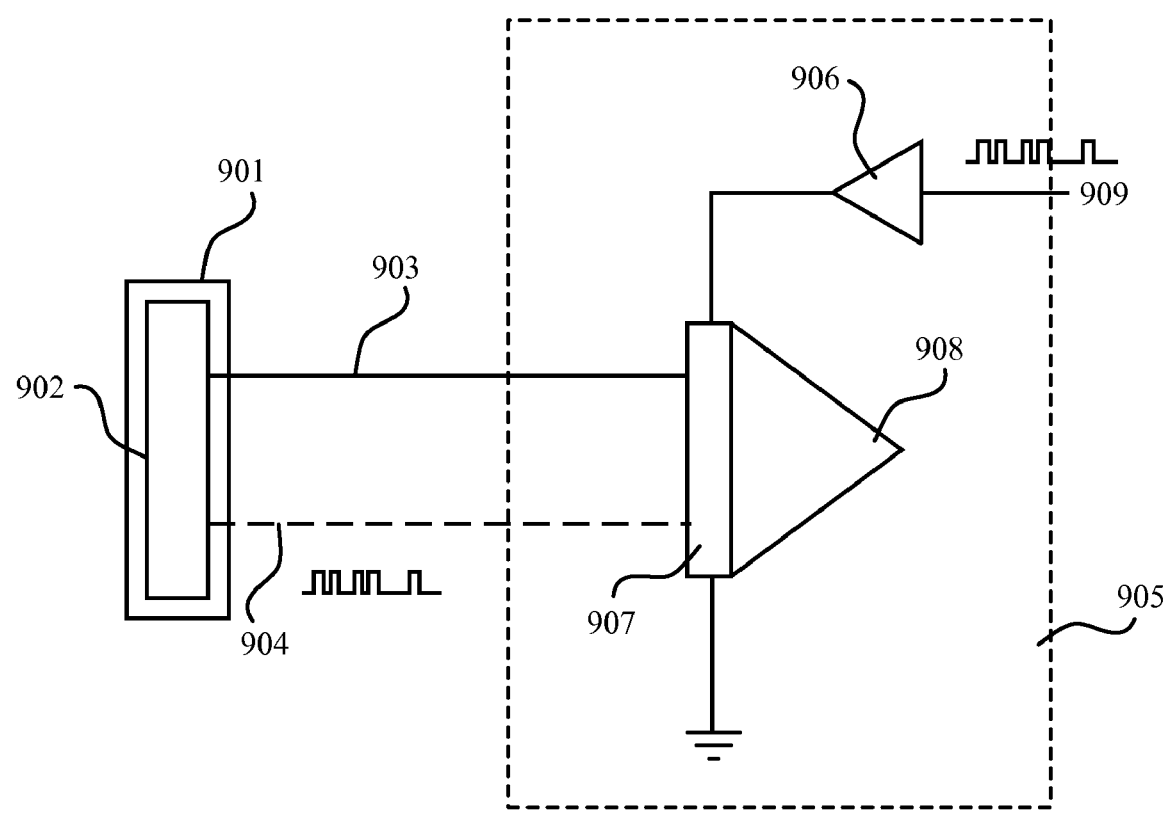
FIG. 9 is a block diagram of an exemplary retroreflector/obturator.

FIG. 9 is a functional block diagram of a polymer-dispersed liquid crystal as an obturator/modulator in use. The system comprises of a base station 901, a transceiver 902 for transmitting 903 and receiving 904 interrogation pulse, a remote station 905, an electronic driver 906 and a polymer dispersed liquid crystal 907. The turn-on or switch-on time is influenced by the applied voltage level and by the thickness of the liquid crystal layer. The voltage levels are preferably in the range of CMOS voltages. The retroreflector 908 is arranged behind the liquid crystal modulator 907.

The polymer-dispersed liquid crystal 907 as mentioned above maintains the bistable state of ON and OFF and acts as an obturator for interrogation pulse stream 903 by blocking and allowing laser signals to pass through the crystal 907. The shuttering of the polymer-dispersed liquid crystal is controlled by the obturator signal provided by the electronic driver 906 capable of delivering voltages corresponding to the input signal 908. The input signal can be any pulse signal preferably pulse position or pulse width pulses.

In the absence of a control voltage, or with small control voltages below a threshold voltage, the incoming laser signals 903 are scattered strongly. Due to immense scattering the laser signals are not able to reach retroreflector 908 and it does not become effective.

If a voltage, which exceeds the threshold voltage, is applied to the liquid crystal cell 907, the cell 907 becomes transparent and the laser signals 903 are able to pass through it. Between the two states, a preferably nearly linear section exists, which is used for the modulation of the laser signals 903. Furthermore, if one liquid crystal cell 907 is not sufficient to achieve a high depth of modulation, then a plurality of such cells 907 may be arranged in a row behind one another.

These voltages cause polymer-dispersed liquid crystal 907 to shutter the interrogation pulse stream 903 passing through it. The modulated interrogation beam travels into and is reflected from the retroreflector 908. The reflected modulated beam then travels back through, and is again modulated by the polymer dispersed liquid crystal modulator to produce the response pulse stream 904 to be sent back to the transceiver 902 for identification and range calculations.

In another embodiment, ferroliquid crystals (FLC) can be used as obturator/modulator to achieve faster data rates. FLCs have faster switching speeds than other types of liquid crystals and are used to make optical shutters and switchers (fast modulation of intensity of transmitted or reflected light as well as the polarization state of "light). Spatial light modulators are also fabricated from FLCs, which provide the basis for advanced display technologies (high resolution, wide viewing angle, low driving voltage).

Figure 10:
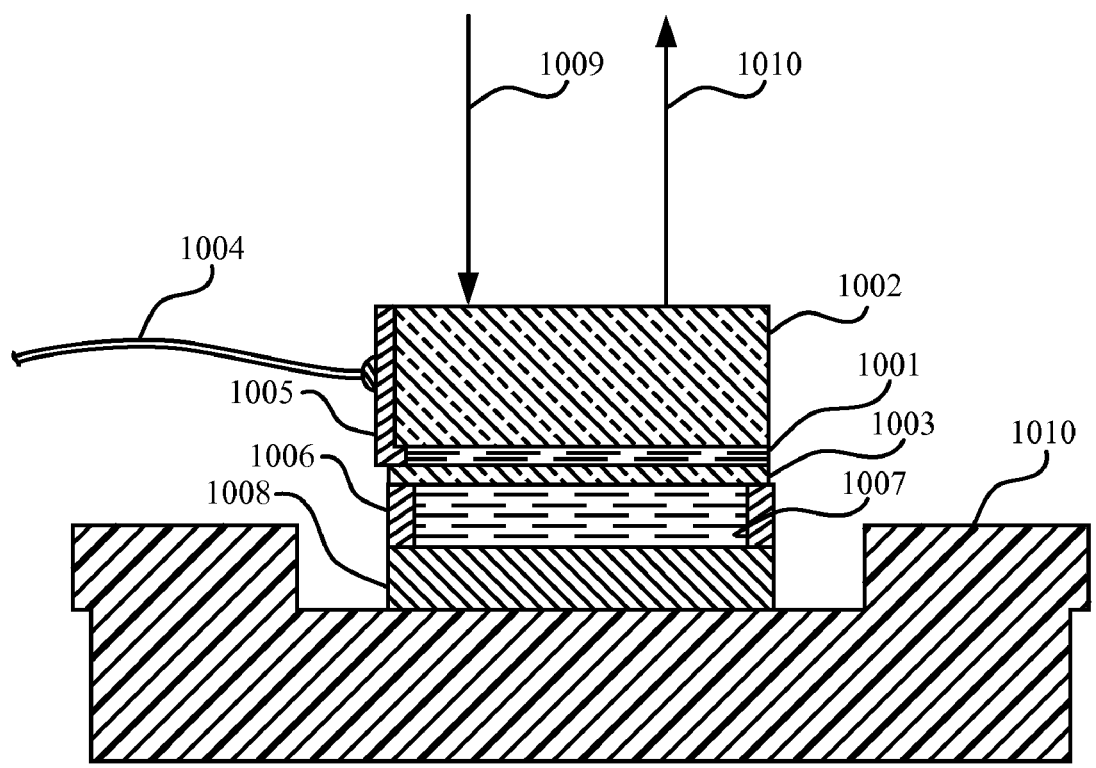
FIG. 10 depicts one embodiment of an exemplary ferroelectric liquid crystal based retroreflector.

Referring to FIG. 10 a cross-sectional view of the ferroelectric liquid crystal retroreflector to be used in the present invention is depicted. This device uses a dynamic memory on a very large scale integration (VLSI) backplane to activate the liquid crystal modulator wherein the FLC layer 1007 is sandwiched between the backplane 1008 and a cover glass 1002.

A transparent and conductive indium oxide (ITO) layer 1001 is deposited on the undersurface of the cover glass 1002. This surface is then coated with an alignment layer 1003. A preferred alignment material is polybutylene terephthalate (PBT). A metallic electrode 1005 with an electrode wire 1004 is mechanically bonded to the cover glass 1002. This metallic electrode 1005 is also electrically connected to the ITO layer 1001 to produce a transparent top electrode. The ferroelectric liquid crystal (FLC) layer 1007 is placed within a SiO spacer 1006 between the top electrode and the VLSI chip 1008.

The VLSI backplane consists of a two-dimensional array of conductive pads acting as electrodes to apply voltage across the FLC layer. The conductive pads also serve as mirrors that output the modulated signal by reflection, since the VLSI backplane is non-transmissive. Each pad is electrically connected to an independent dynamic memory cell within the VLSI chip. Each memory cell stores a binary bit of data (i.e., 1 or 0) received from the obturator driver (not shown) in the form of voltages.

These voltages are applied to the conductive pixel pad to produce an electric field between the pad and the transparent top electrode. By applying 2.5 volts to the top electrode, the electric field vectors at each pixel have equal magnitude, but the electric field vectors change direction depending on whether the data bit is a 1 or 0. The direction of the electric field vectors switches the FLC into one of two states by interacting with the polarized FLC molecule to produce either right- or left-handed torque on the molecule. A FLC molecule is free to rotate through small angles and will pivot about the smectic layer normal orientation ([agr].sub.0) until the torque, viscous, and elastic forces are equalized. This molecular rotation results in a bulk reorientation (or tilt) of the liquid crystal's optical axis. A nonlinear FLC material acts as a half-wave retarder. A half-wave retarder rotates the light's polarization by 2[phgr], where [phgr] is the angle between the light's polarization and the waveplate's optic axis. In the present invention, the polarization of the incident/interrogation beam 1009 is rotated by twice the-tilt angle ([PSgr]) of the optic axis. For example, if the FLC's optic axis tilts.+-.0.22 degrees about the smectic layer normal orientation, the net change of 44 degrees in the optic axis will rotate the light's polarization by 88 degrees.

Rotation of the FLC material's optic axis (which is controlled by the direction of the electric field) produces a change in the light's polarization. This change in polarization can be converted to amplitude or phase modulation depending on the orientation of the FLC layer with respect to the polarization of the incident/interrogation beam 1009. The modulated beam 1010 is then received by the interrogating device for identification and range finding.

In another embodiment, a micro-electro-mechanical system (MEMS) device is used as obturator/modulator. The Micro-Electro-Mechanical System integrates mechanical elements, sensors, actuators, and electronics on a common silicon substrate through microfabrication technology. While the electronic devices are fabricated using integrated circuit (IC) process sequences (e.g., CMOS, Bipolar, or BICMOS processes), the micromechanical components are fabricated using compatible "micromachining" processes that selectively etch away parts of the silicon wafer or add new structural layers to form the mechanical and electromechanical devices.

Figure 11:
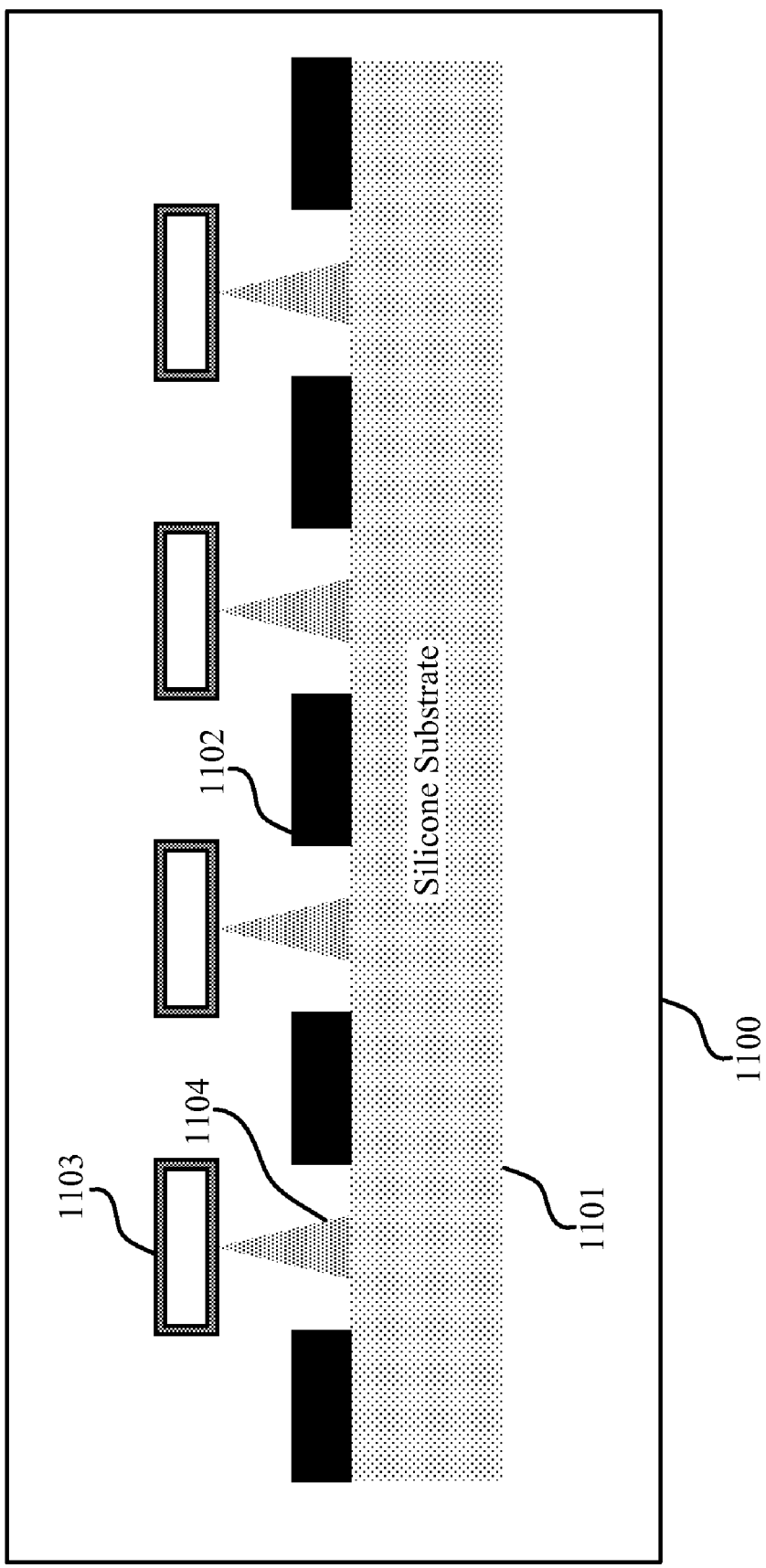
FIG. 11 depicts an exemplary arrangement of a MEMS device.

FIG. 11 depicts an arrangement of a MEMS device. It comprises of a base 1101, electrodes 1102, micromirrors 1103, and an insulator 1104. The base is preferably made of silicon. Between each electrode is a piece of silicon oxide, which serves as an insulator 1104 and the base for micromirror 1103.

Figure 12:
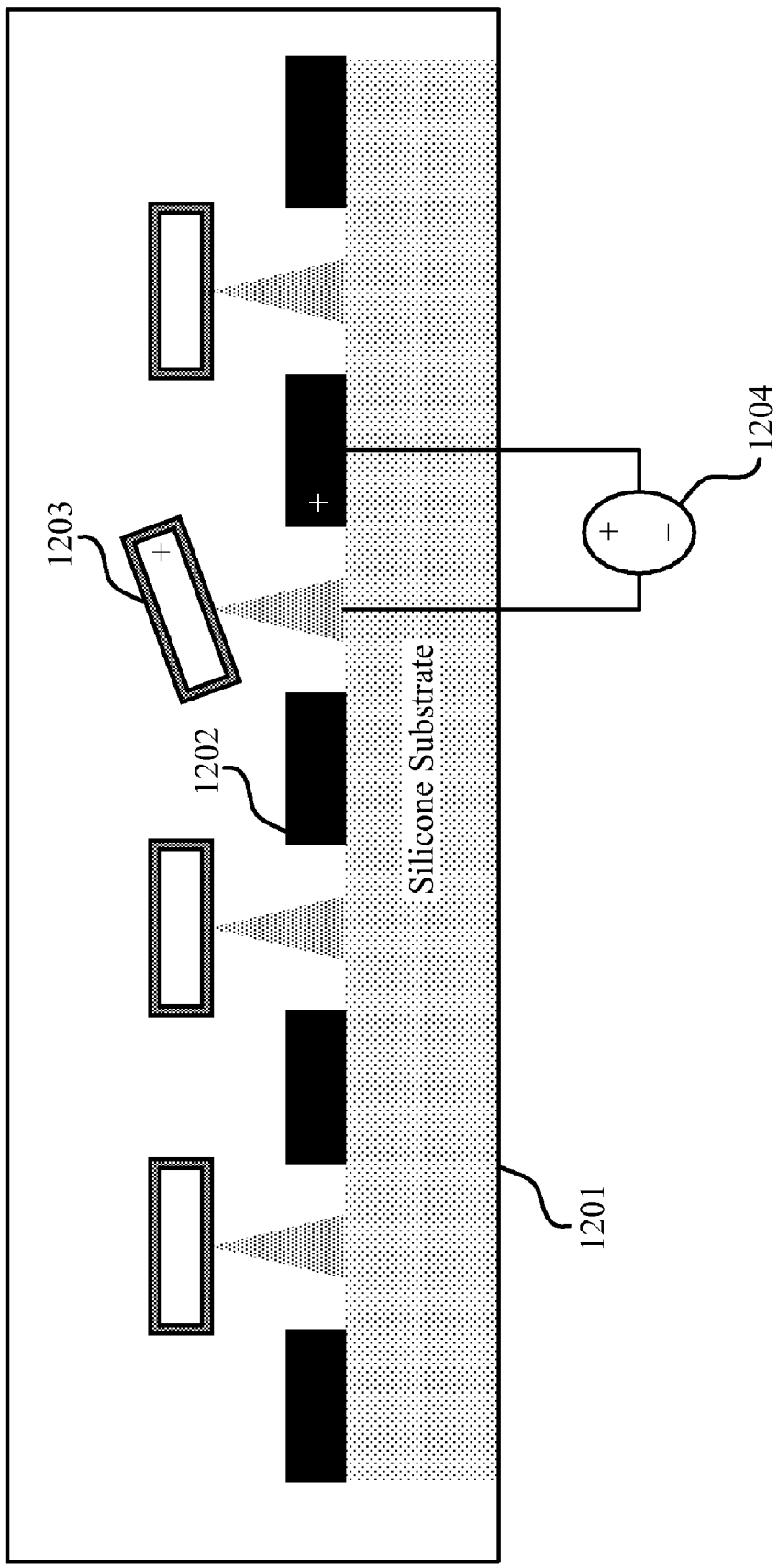
FIG. 12 depicts an exemplary arrangement of a MEMS device upon application of an electric field.

FIG. 12 depicts an arrangement of the above MEMS device when an electric field is applied. The electrodes 1202 direct the micromirrors 1203. When a voltage 1204 is applied to the electrode 1202, the electric field developed between the micromirror 1203 and electrode 1202 results in the movement of the micromirror 1203. The deflection of mirrors is a few degrees. By combining it suitably with the light source, the micromirror 1203 reflects incident light into or out of the MEMS device 1201.

The above arrangement can modify an optical beam into a modulated light stream, each micromirror 1203 forming obturators capable of selective activation or deactivation. The micromirrors 1203 are attached by the means of any elastic fastening known to those of ordinary skill in the art to enable resisting rotation away from a predetermined rest position and to selectively control the rotation thereof away from rest position. Micromirrors 1203 are generally placed in the optical paths of light pulses (not shown) in order to interrupt or modify light paths in accordance with their positions.

Figure 13:
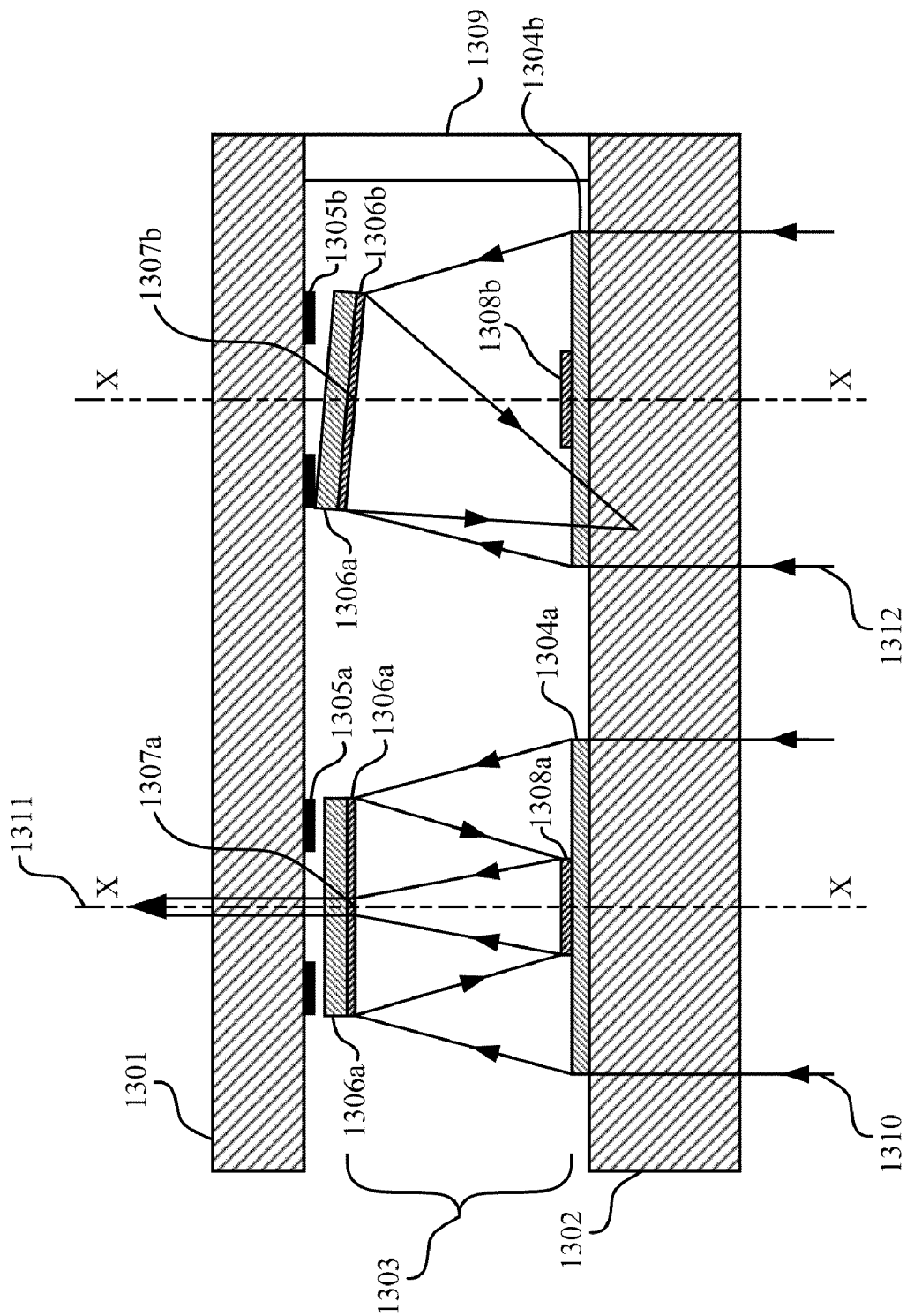
FIG. 13 depicts an MEMS device operating as an retroreflector/obturator.

FIG. 13 shows an exemplary embodiment of MEMS working as an obturator/modulator. The MEMS consists of input 1301 and output 1302 transparent plates and a wafer 1303 forming a substrate between the plates. Convergent focusing lenses 1304a and 1304b, electrodes 1305a and 1305b, micromirrors 1306a and 1306b, diaphragm 1307a and 1307b, and supplementary reflecting surface 1308a and 1308b are micromachined units of the wafer 1303. Frame 1309 forms a spacer surrounding the network of micromirrors 1306 and maintains a defined distance between the output plate 1302 and wafer 1303.

In operation, when no voltage is applied the MEMS is in non-activated state. The incident light 1310, being initially focused by convergent focusing lens 1304a, is sent backwards by the reflecting surface of the micromirror 1306a, then reflected forwardly by the supplementary reflecting surface 1308a and finally sent towards the exterior through the diaphragm 1307a to act as modulated light beam 1311.

Conversely, when voltage is applied, the MEMS device is in activated state. Due to application of voltage the micromirror 1306b is turned through a small angle. The activated configuration leads to a deflection in the light beam 1312, initially focused by the convergent focusing lens 1304b and sent back by the reflecting surface present on the micromirror 1306b, outside the field associated with the supplementary reflecting surface 1308b. The latter is thus not in a position to cause the passage of the light through the diaphragm 1307b, and, as a result, shuttering takes place.

The suppression of the control voltages again resets the micromirror 1306b into its initial position due to the elastic strain force generated in the micromirror 1306b fastenings. When the voltage is withdrawn from the MEMS device, it starts transmitting the incident light and hence ON-OFF keying of the optical signal can be observed.

The present optical communication system uses pulse position or pulse width modulation to control the operation of the electronic driver connected to MEMS. Each data bit in the obturator driver results in the obturator signal/voltage to provide the activation-deactivation voltages. The control voltages make the MEMS to shutter the interrogation pulse stream passing through it. Thus, if the bit is active, the mirror is turned ON during the bit period and light in the form of interrogation pulse stream is shuttered during this period. If the bit is not active the mirror is turned OFF and the light enters the MEMS to produce the modulated response pulse stream to the source for identification and range finding.

In another embodiment, multiple quantum wells (MQW) can also be used as retro reflectors wherever there is need for fast data rates. Multiple quantum wells are semiconductor structures composed of alternating thin layers of two or more different semiconductor materials and, in particular, of semiconductor materials having differing bandgaps for example, GaAs, AlGaAs, and InGaAs among others. MQW structures are usually produced using well-known epitaxy techniques, such as molecular beam epitaxy or metal-organic chemical vapor deposition sometimes known as organometallic vapor phase epitaxy. Typically, layer thickness is of the order 100 Angstroms and a typical structure might comprise 100 such layers, resulting in a total thickness of about 1 micrometer.

The advantage of the MQW device technology for an optical communication system is that it operates on low power and can provide fast modulation rates. The maximum speed of a MQW modulator is determined, up to THz rate, by the RC time constant of the device and its driver. For available drivers and MQW structures speed of about 10 MHz is possible with a square centimeter aperture device. The optical modulators using MQW can be designed to be rugged and lightweight.

By coupling MQW technology with optical communications system, optical transceiver for secure, high speed data transmission can be produced. These devices require very low power and are less likely to interfere with the surrounding equipment than other devices. MQW devices are generally compact, low mass, rugged and environmentally stable. Conventional electronic circuits, such as TTL logic, can power these devices. These characteristics make these devices suitable for remote data transmission from sensitive or high value platforms, such as satellites and unpiloted airborne vehicles.

Figure 14:
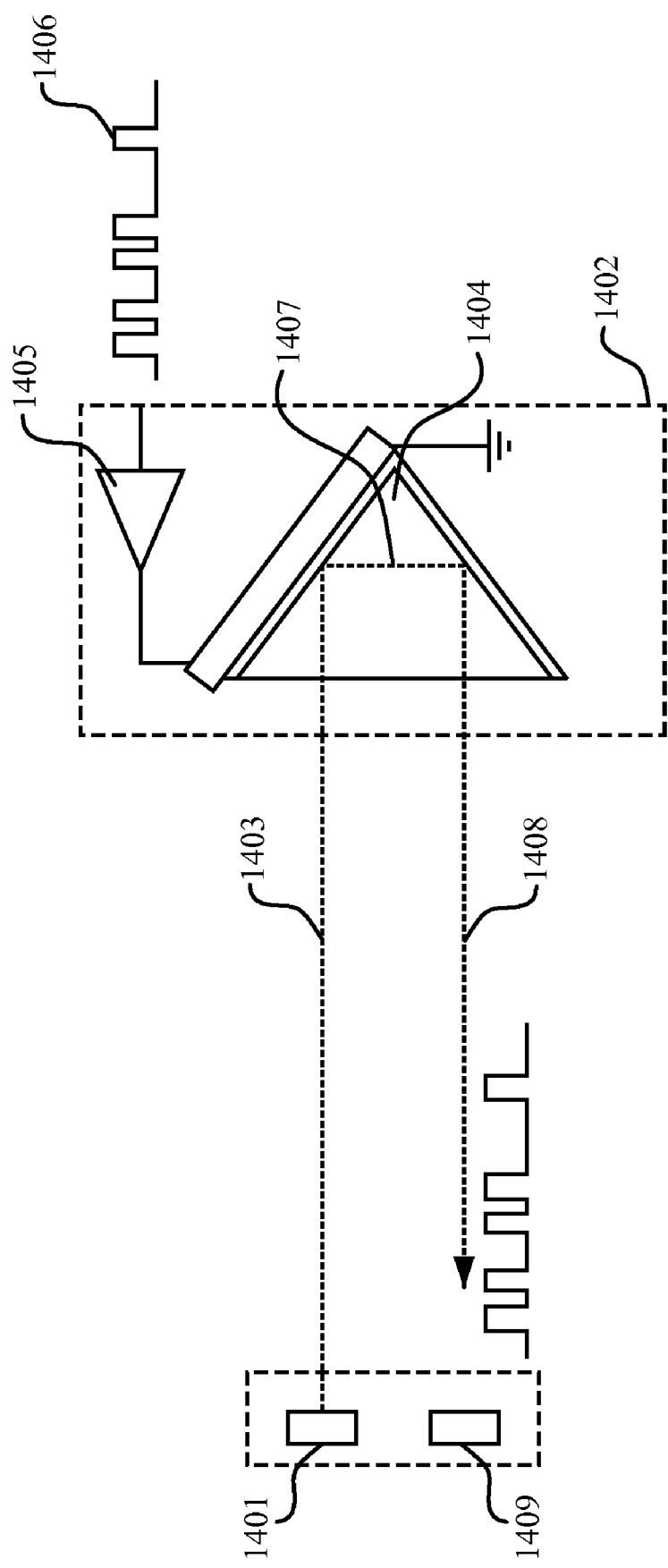
FIG. 14 depicts an exemplary embodiment of a multiple quantum well.

Referring to FIG. 14 is an exemplary embodiment of Multiple Quantum Well working as an obturator/modulator is depicted. The Base station transmitter 1401 transmits an interrogation signal 1403 to a remote object 1402. The interrogation signal 1403 passes through MQW modulator 1404 controlled by an electronic driver 1405, which impart voltages across MQW modulator 1404 corresponding to input signal 1406. These voltages cause MQW modulator 1404 to shutter the interrogation light passing through it, resulting in a modulated interrogation beam 1407 and is then reflected back.

The reflected modulated beam 1407 after that travels back through, and is again modulated by MQW modulator 1404, thus reinforcing the original modulation. After passing through the MQW modulator 1404 for a second time, reflected modulated beam 1408 finally travels to the base station receiver 1409 for identification and range calculations.

It is important to note that the selection of the retroreflector is largely dependent on the nature of use and rate of modulation required. For example, as we move from PDLC to FLC to MEMS to Quantum Well, the modulation rate keeps on increasing and it ranges from 1 KHz in case of PDLC to 1 GHz in Quantum Wells.

In each of the above embodiments, the optical retroreflectors may be temperature stabilized with a thermoelectric cooler and/or a resistive heater to optimize the contrast ratio for a given operating environment. In addition to or in place of such devices, as discussed above, a bias voltage may be applied to the device and adjusted to compensate for temperature changes by a small battery delivering the required power. The time taken to heat the crystal is approximately 0.9 milliseconds.

In one embodiment, a PDLC is used in an environment having an ambient temperature at or below 20 degrees Celsius. To minimize the drain on the voltage source, such as the battery, the heating is preferably done only when the device, or the user operating the device, recognizes that an incoming communication signal has been recognized and a communication channel needs to be established. For example, in a secure covert operation, as described below, the heating element will activate after an initial transmit signal is positively identified by a response unit. Upon such recognition, the optical retroreflector will activate the PDLC heater in order to warm the PDLC unit up, if the temperature is below 20 degrees Celsius. Because the heater can take 10 to 60 ms to bring the temperature of the PDLC up to the point that it can effectively operate in the required response time, it is preferred to have the transmit signal repeat several times, thereby being ready to correctly modulate the response pulses in subsequent transmissions.

In one embodiment, a heating element is integrated with retroreflectors of the present invention. A user activates the heating element, to prepare for a known optical transmission. Alternatively, an optical transmission can include an initial interrogator message acting as a wakeup message. The wakeup message causes the heating element to be activated, i.e., a voltage source, and for heat to be applied to the retroreflector, i.e., by subjecting it to a bias voltage. The rapid heating process, preferably taking less than a few milliseconds, enables improved operational performance, thereby allowing the system to work substantially optimally even if the temperature drops below a certain threshold level.

The retroreflector and range finding system, disclosed in the present invention, can be exploited in an assortment of applications including, ground to air, ground to space, air to air, air to space and space to space data transmission, and, more, specifically but not limited to, secure covert operations, microsatellites, dynamic optical tags (DOTs), and tetra hertz operational reachback (THOR). The following section describes a few embodiments where the above described integrated laser range finding and optical communication system can be used.

Secure Covert Operation

One embodiment of the present invention is directed toward a secure covert operation for combat comprising a combat response unit having a helmet-mounted challenge receiver and a retroreflector/obturator, including the steps of projecting a high pulse laser signal and a transmitted code of the day (TCOD) onto the combat response unit from a combat interrogatory unit, receiving the laser transmit signal and TCOD at the challenge receiver, selectively reflecting the laser transmit signal by opening and closing the retroreflector/obturator according to a response code of the day (RCOD), receiving the reflected laser transmit signal and RCOD at the combat interrogatory unit, and combining the received RCOD with the TCOD to identify the combat response unit and its position. The present invention can be used, therefore, to conduct laser range finding, perform code transmissions, and conduct voice communications.

Figure 15:
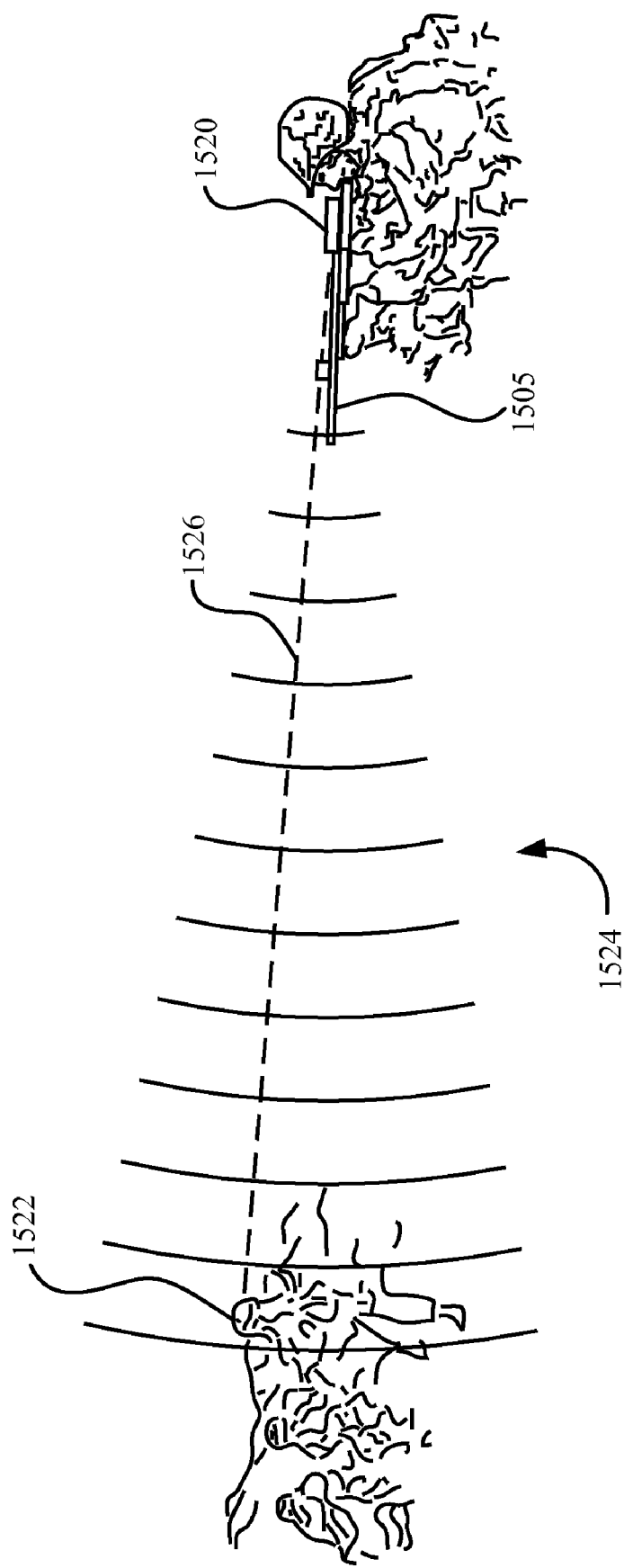
FIG. 15 is a sketch illustrating the operation of the combat identification system of this invention.

FIG. 15 illustrates the operation of the combat identification system of this invention. The combat interrogatory unit 1520 of this invention is shown in a preferred weapon-mounted disposition where the challenging soldier may target the helmet-mounted combat response unit 1522 of this invention worn by a soldier in a combat simulation exercise or in actual combat. One of ordinary skill in the art would appreciate that the response unit 1522 could be mounted in any location proximate to or on the soldier, including a vest, belt harness, or other device. Further one of ordinary skill in the art would appreciate that the response unit 1522 could be mounted to an object, such as a tank, building, conventional transceiver, vehicle, plane, or other structure.

An infrared (IR) transmit signal 1524 is projected by unit 1520 upon operator command. Transmit signal 1520 radiates outward along a narrow beam, eventually illuminating response unit 1522. For example, transmit signal 1524 may be embodied as a 6-milliradian beam of 1540 nm IR light, which then illuminates an area of about 6 meters on a side at a typical weapon range limit of 1000 meters. Upon being received, detected and verified at response unit 1522, transmit signal 1524 is then retroreflected back to interrogatory unit 1520 as the response signal 1526. For a 6-milliradian transmit signal 1524, response signal 1526 includes a reflection of, for example, a 1.5-centimeter portion of the 6-meter transmit beam 1524. This 1.5 cm reflected portion includes about 0.002 percent (−47 dB) of the initial energy of transmit signal 1524, which is generally reflected back to interrogatory unit 20 by a precision retroreflector. Response signal 1526 is received at interrogatory unit 1520 reduced by an additional −8 dB, which leaves sufficient power for combat personnel detection and processing at interrogatory unit 1520. The 1540 nm signal wavelength is preferred because it is eye-safe and has relatively low absorption and scattering loss in the usual battlefield smoke and haze.

Operationally, the user can choose to use the signal in order to determine the range of a combatant, tank, building, truck, vehicle, or other object, as previously discussed, or as a mechanism to communicate important information, including but not limited to, code identifications, such as whether the individual is a "friend" or "foe," and audio communications.

Figure 16:
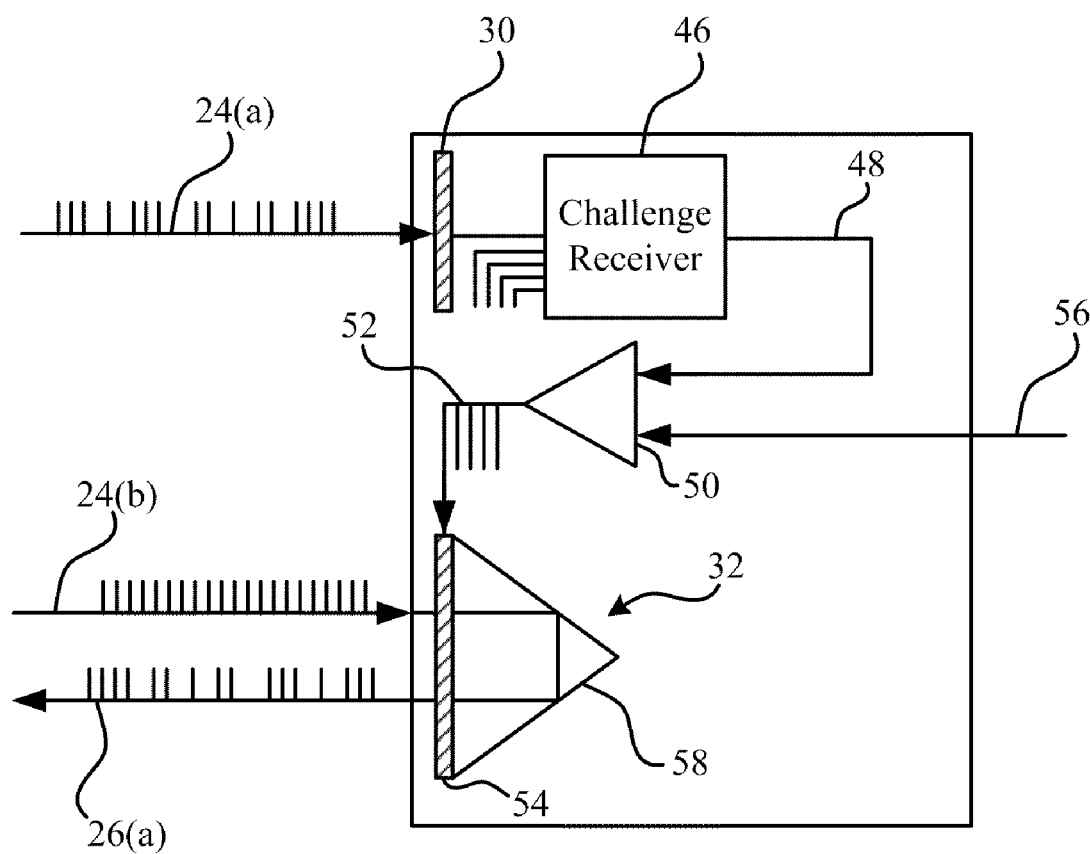
FIG. 16 is a schematic diagram illustrating the optical operation of a combat response unit of the present invention.

When used to communicate code identifications, the present invention can modulate code signals, including transmit and receive code signals, on to the laser signal. FIG. 16 is a schematic diagram illustrating the optical operation of a response unit. As described in detail here in below in connection with FIG. 19, transmit signal 24 includes a transmit code of the day (TCOD) including a frame-synchronization preamble (not shown) followed by a TCOD 24(a) followed by a TCOD interrogation pulse stream 24(b). In operation, TCOD 24(a) is received by one or more of the plurality of IR sensors 30 and presented to the challenge receiver 46 for verification. When TCOD 24(a) is verified, challenge receiver 46 produces a response code of the day (RCOD) signal 48, which includes a logical combination of selected information from TCOD 24(a) and from the local memory of challenge receiver 46 (not shown) that is described in detail herein below. RCOD signal 48 is presented to the obturator driver 50, which produces an obturator signal 52 for opening and closing (making translucent and opaque) the obturator 54 in each of the plurality of retroreflector/obturators 32.

To provide for a secure communication and identification system, it is preferred that the present invention is not operable, nor are the related algorithms or source codes available, through reverse engineering in an instrumented lab. If an embodiment of the present invention could be made operable by an individual who is not authorized to operate the device or if that unauthorized individual could access the methods and/or codes used to drive the device, the security of the system would be compromised. To avoid compromising security, it is preferred that the system uses narrow laser beams for bi-directional communications; a secret rolling code of the day that changes over a pre-designated time period and is only known to authorized persons; a randomly generated number that is known to the interrogator and receiver; processes that utilize encryption of the COD by the RGN in both directions; identification methods, such as fingerprints, voice, or manual keying, to determine if an authorized person is using the weapon; hardware with a secure area; and self-destruct mechanisms to destroy software and codes upon deconstruction of the device.

A biometric identification (ID) signal 56 is also presented to obturator driver 50 to enable or disable operation thereof based on the verification of a scanned thumbprint input by the dismounted soldier in possession of helmet-mounted response unit 22, which is further described herein below in connection with FIGS. 17 and 20(a)-(d). RCOD signal 48 includes a delay and a response pulse stream 26(a). The RCOD delay is sufficient to permit TCOD interrogation pulse stream 24(b) to arrive at reflector/obturator 32. Obturator 54 is then cycled open and closed in accordance with obturator signal 52 to produce response pulse stream 26(a) by reflecting selected elements of interrogation pulse stream 24(b) from the retroreflector 58 in at least one of the plurality of retroreflector/obturators 32.

One of ordinary skill in the art would appreciate that various identification measures could be used to insure the operator of the response unit or interrogator unit are authorized users, including the user's voice pattern, or a keyed in verification input, i.e., a password. For example, a transceiver integrated with a memory and processor could be used to recognize an authorized voice pattern. If a received audio input matches a stored pattern, the processor communicates a positive signal 58 back to the to obturator driver 50. Similarly, a keypad in data communication with a memory and processor could be used to receive a data input from a user. If the data input matches an authorization code stored in the memory, the processor communicates a positive signal 58 back to the to obturator driver 50.

Additionally, the identification measures could optionally be subject to a timer that requires the user to periodically demonstrate that he or she is, in fact, an authorized user. The timer is programmed to activate a verification process on a periodic basis, such as once every 24 hours. The verification process requires a user to input identification data, such as biometric or personal data, into the unit or indicate activity, i.e., through motion, via motion sensors. Entering this verification information in time will ensure the unit retains the codes used to generate the transmit signal. Failure to enter this information in time will cause the unit to turn off the use of codes or possibly destroy the existence of codes under the assumption that the unit has fallen outside of the possession of an authorized user and must therefore be stripped of its codes.

Figure 17:
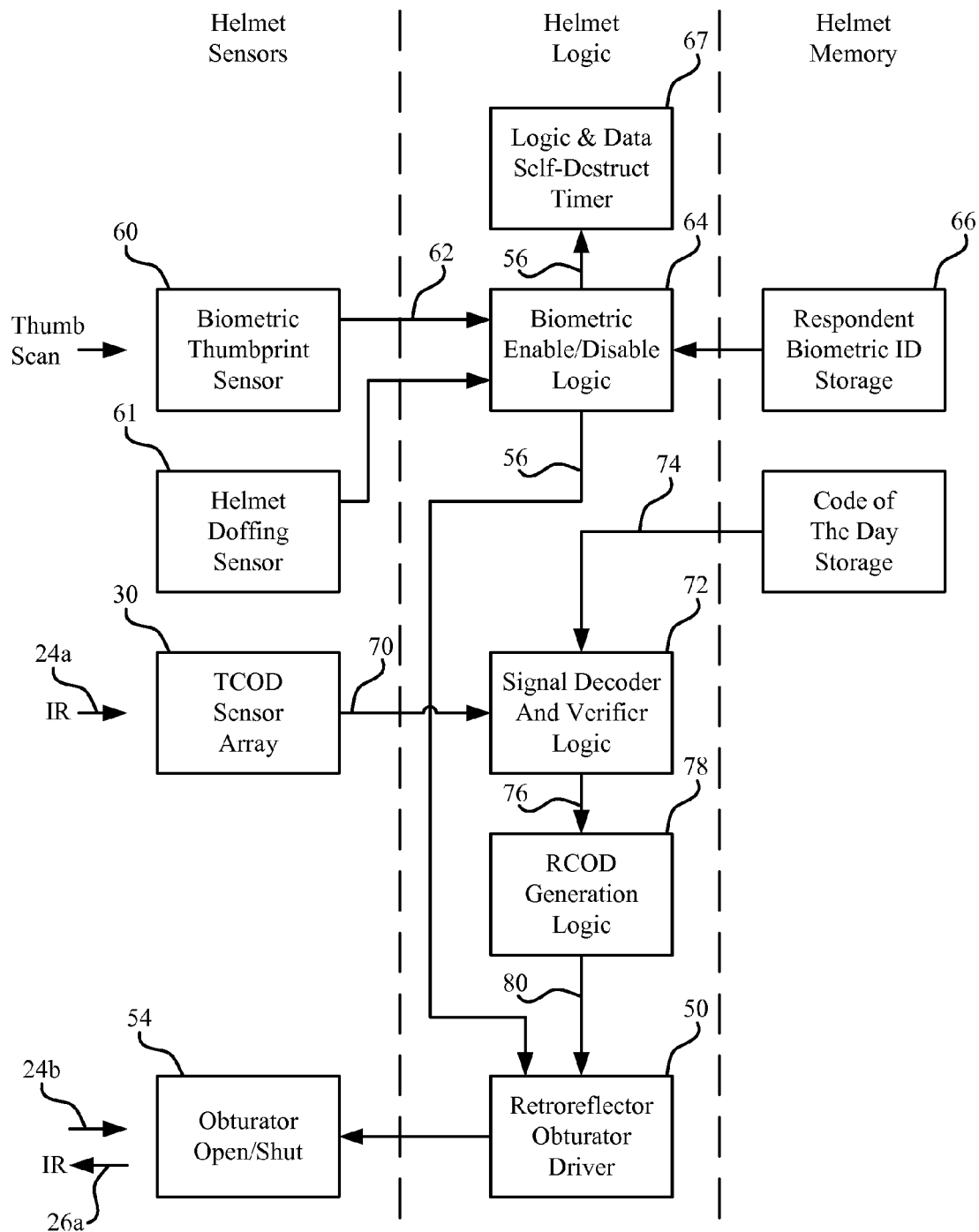
FIG. 17 is a schematic block diagram illustrating the logical operation of a combat response unit of the present invention.

FIG. 17 is a schematic diagram illustrating the logical operation of a response unit. The elements of FIG. 17 are arranged in three functional categories for clarity; (a) helmet sensors, (b) helmet logic and (c) helmet memory. In operation, helmet-mounted response unit is first programmed with certain biometric data unique to the user and with a code of the day (COD), which includes a challenge code (CC) followed by a response code (RC). The helmet is then donned by the user according to a predetermined anti-spoofing protocol. The donning soldier first passes his/her thumb over a biometric thumbprint sensor 60 in a manner (known only to the soldier) for which response unit 22 has previously been programmed. Biometric thumbprint sensor 60 produces the coded biometric data stream 62, which is immediately evaluated by the biometric identification logic 64. This evaluation involves comparing data stream 62 to the earlier-stored thumbprint scan, data 66 for the donning soldier to produce an enable/disable decision. If logic 64 decides that the thumbprint scan fails, the soldier may be afforded, for example, two additional opportunities to enable the helmet-mounted response unit by means of an audible or visual indicator (not shown). After two additional attempts, logic 64 decides that the biometric ID is invalid, and sets biometric ID signal 56 to "disable" obturator driver 50, permanently shutting obturator 54 to prevent any retroreflection. Moreover, biometric ID signal 56 may also be presented to a self-destruct timer 67, which begins a logic and memory self-destruction countdown. When completed, this countdown triggers the erasure of all logic and data stored in the helmet memory, thereby making a captured helmet-mounted response unit worthless to an enemy. The helmet electronics may easily be reprogrammed by the friendly forces for use in another combat exercise or the like.

After successfully completing a thumb scan and donning the helmet, biometric ID signal 56 is set to "enable" and obturator driver 50 is enabled so the soldier is thereafter equipped to passively respond to valid incoming interrogatory signals in the manner now described. When the soldier again doffs the helmet, the helmet-doffing sensor 68 immediately signals logic 64, which resets biometric ID signal 56 to "disable" and obturator driver 50 is again disabled, permanently shutting obturator 54 to prevent any retroreflection.

In use, a response unit first begins the secure covert communication upon the arrival of IR transmit signal 24 from interrogatory unit 20. TCOD 24(a) is received by at least one IR sensor 30, which produces a signal 70 that is presented to the signal verification and decoding logic 72. The relative location on the helmet of the particular IR sensor 30 receiving the signal is identified in logic 72 to determine the arrival quadrant (Front, Right, Rear, or Left) of IR transmit signal 24. This arrival quadrant information may be used in logic 72, for example, to bias other processing parameters or to signal the helmeted soldier, by audible or visual means, of the arrival quadrant so that appropriate action may be undertaken (such as, for example, skeptical evasion of interrogatories arriving from behind enemy lines).

TCOD 24(a) is validated by examining it to verify that it includes a valid CC followed by a randomly generated number (RGN). This is accomplished by comparing the received CC with the CC portion of the COD 74 stored in the helmet and accepting the RGN if the incoming CC matches the stored Cc. The entire stored COD 74 and the incoming RGN are then passed as a data signal 76 to the response code of the day (RCOD) generation logic 78, which creates the RCOD 80 by combining the CC and RC portions of the stored COD with the PRN in a predetermined manner. After generation, RCOD 80 is passed to obturator driver 50 for use in opening and shutting obturator 54 accordingly. The first portion of RCOD 80 is a closed shutter interval that is computed as a combination of the stored RC and the incoming RGN. The second portion of RCOD 80 is an open-shutter interval that is determined by some portion of the CC. RCOD 80 is synchronized to begin at a predetermined interval (such as 10 ms) after the end of the incoming TCOD so that the interrogator may evaluate RCOD 80 to verify that the reflecting response unit is a mend and not a foe, thereby completing the IFF transaction.

Figure 18:
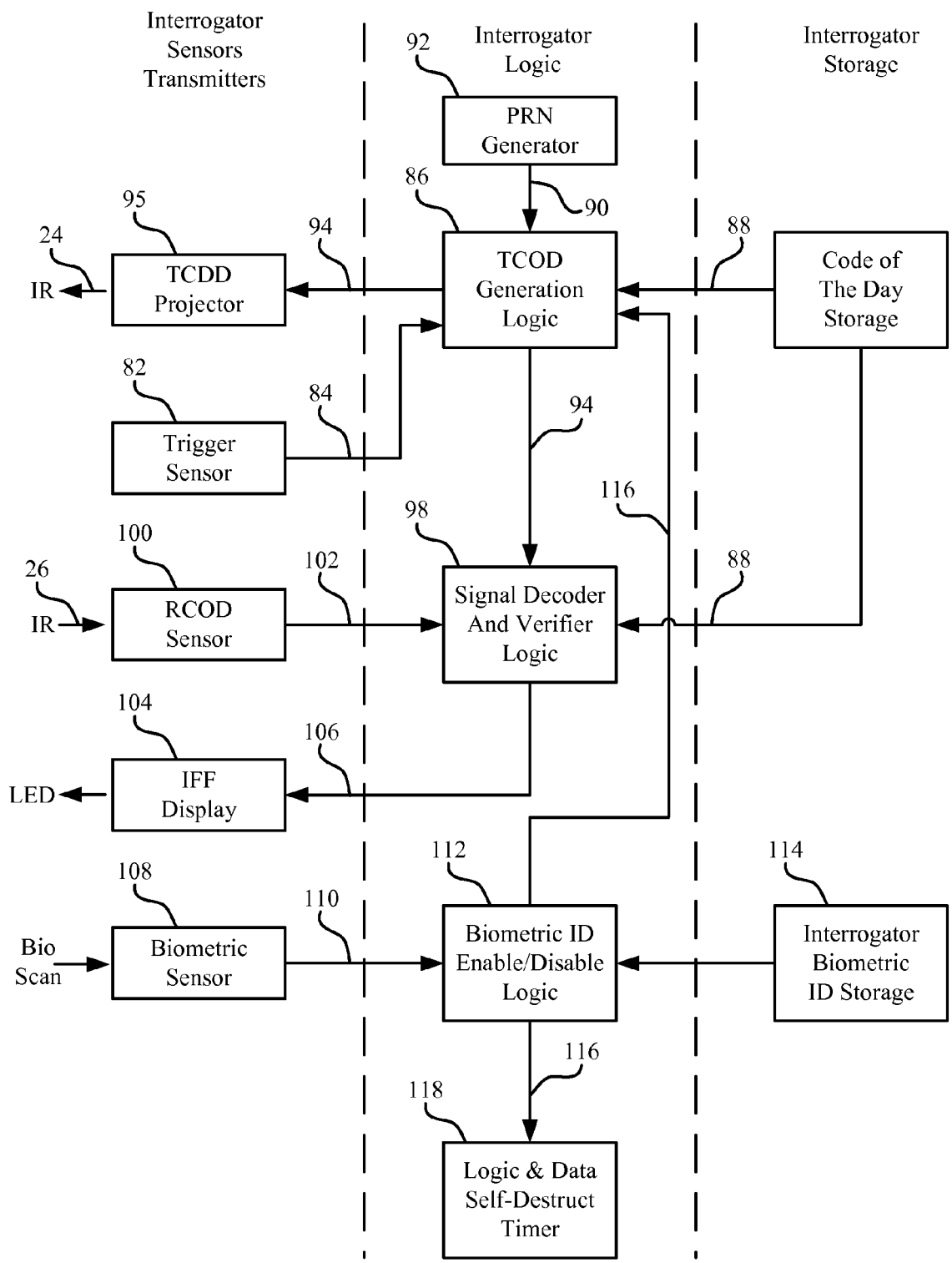
FIG. 18 is a schematic block diagram illustrating the logical operation of a combat interrogatory unit of the present invention.

FIG. 18 is a schematic diagram illustrating the logical operation of interrogatory unit. The elements of FIG. 18 are arranged in three functional categories for clarity; (a) interrogator sensors/emitters, (b) interrogator logic and (c) interrogator memory. In use, an interrogatory unit first begins the secure covert communication when the trigger sensor 82 detects a command from the operator to interrogate a target. Trigger sensor 82 produces a signal 84 that is presented to the TCOD generation logic 86, which responsively retrieves a locally-stored copy of the COD 88 and a RGN 90 from a pseudorandom number (PRN) generator 92. TCOD generation logic 86 then combines the CC portion of COD 88 with RGN 90 to produce the TCOD portion of TCOD 94, which is then followed by the TCOD interrogation pulse stream. TCOD 94 is then amplified as necessary to drive the TCOD projector 96, which produces the IR transmit signal 24, initiated with the frame-synchronization preamble (not shown), and directs it to the target. TCOD is also presented to the signal decoder and verifier logic 98 for use in processing any incoming IR signals received at the IR sensor 100. When the TCOD portion of TCOD 94 is transmitted (see FIG. 19), logic 86 notifies logic 98 of the start of the response interval. Any incoming response signal 26 at RCOD sensor 100 produces a RCOD signal 102 that is presented to logic 98 for evaluation. Logic 98 reverses the encoding process discussed above in connection with FIG. 17 and below in connection with FIG. 19.

RGN 90 and the RC from COD 88 are used to compute the proper closed-shutter interval, which is compared to the delay interval between completion of the transmission of TCOD 94 and the beginning of response pulse stream 26(a). The appropriate elements of COD 88 are then used to compute the proper open shutter interval, which is then compared to the actual length of the incoming response pulse stream 26(a). If the two comparisons are not successful, logic 98 does nothing; leaving the display 104 inactive. When the comparisons are both successful, logic 98 produces an indicator signal 106, which activates display 104, thereby completing the transaction. Display 104 may be a simple light-emitting diode (LED) indicator or an audible signal or any other useful indicator consistent with requirements for security and covertness.

As described above in connection with FIG. 17, an interrogatory unit may also include anti-spoofing means to prevent use by an enemy of a captured interrogatory unit. A biometric sensor 108 may be used to accept thumbprint or fingerprint input or retinal image input or any other useful biometric data unique to the authorized operator. Upon activation, biometric sensor 108 presents the incoming biometric data 110 to the biometric ID logic 112 for comparison to the biometric ID data 114 stored previously by the same soldier. If, at some point, logic 112 decides that the biometric ID is invalid, a biometric ID signal 116 is set to "disable" and TCOD generator logic 86 is disabled, permanently shutting down TCOD projector 96. Moreover, biometric ID signal 116 may also be presented to a self-destruct timer 118, which begins a logic and memory self-destruction countdown. When completed, this countdown triggers the erasure of all logic and data stored in the interrogator memory, thereby making a captured weapon-mounted interrogatory unit worthless to an enemy. The interrogator electronics may easily be reprogrammed by friendly forces for use in another combat exercise or the like.

After successfully completing a biometric scan, biometric ID signal 116 is set to "enable" and TCOD generator logic 86 is enabled so the soldier is thereafter equipped to actively interrogate targets in the manner described above. After a predetermined period of inactivity, established by, for example, a simple timer (not shown), logic 116 resets biometric ID signal 116 to "disable" and TCOD generator logic 86 is again disabled, permanently shutting down TCOD projector 96.

Figure 19:
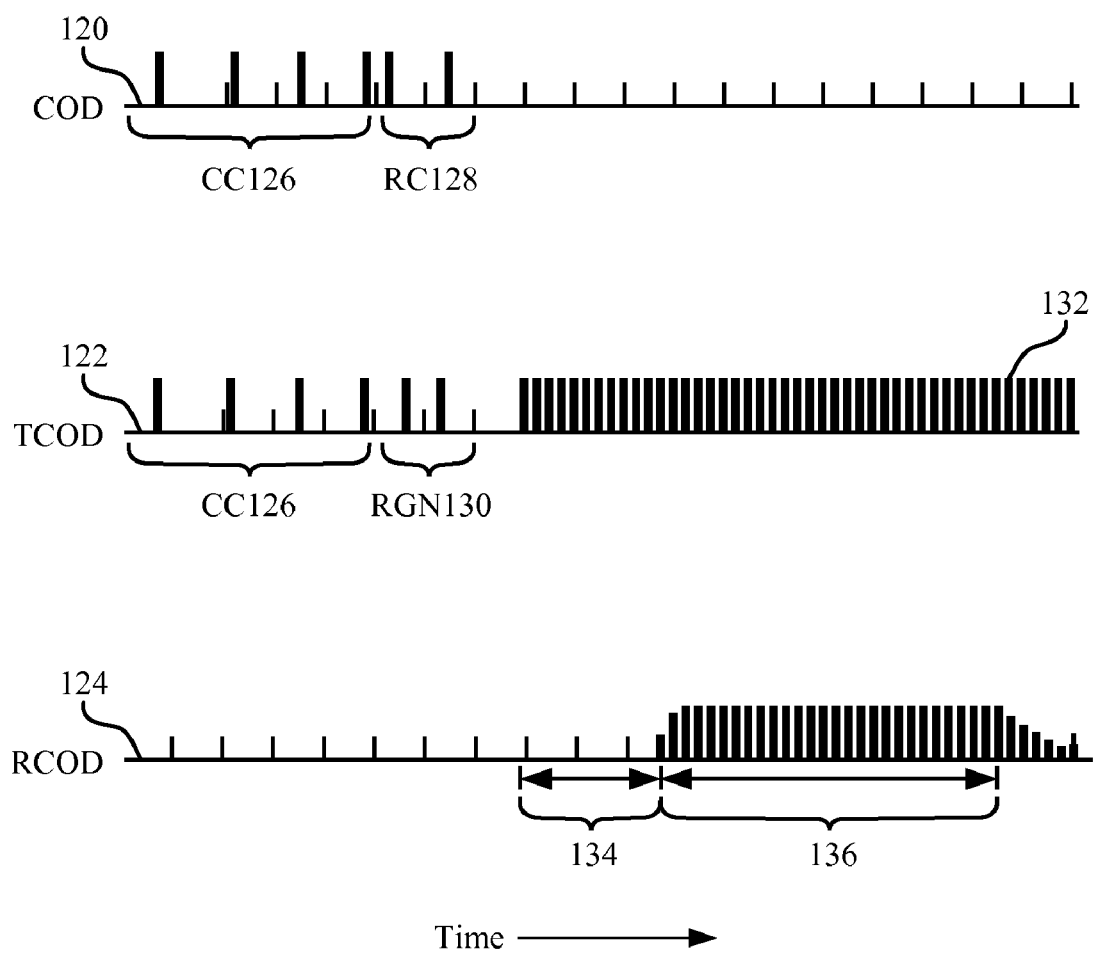
FIG. 19 is a chart illustrating the relationship between examples of the code of the day (COD), the transmitted code of the day (TCOD) and the response code of the day (RCOD) according to one method of this invention.

FIG. 19 is a chart illustrating the relationship between exemplary embodiments of the COD 120, the TCOD 122 and the RCOD 124 of this invention. Each of the six symbols of COD 120 and TCOD 122 are 7-bit values (ranging from 0-127) encoded as pulse positions within a 36 microsecond frame interval, which is established and synchronized for each transaction by a three-pulse TCOD frame-synchronization preamble (not shown). Each pulse is 66.67 ns in duration, which allows the use of an inexpensive microprocessor (not shown) for implementing the various logic described herein.

The position of a pulse within a frame represents the corresponding 7-bit symbol. COD 120 is changed daily and all interrogatory units and response units in a system are updated daily with the new COD 120. COD 120 includes a 4-symbol CC 126 and a 2-symbol RC 128. TCOD 122 includes CC 126 and a 2-symbol RGN 130 followed by a 10 ms buffer interval followed by TCOD interrogation pulse stream 132 consisting of a 50 ms stream of I-ms spaced pulses. RCOD 124 includes a delay 134 during the closed-shutter interval followed by a response pulse stream 136 during the open shutter interval. Delay 134 is computed by dividing the absolute value of the difference between RGN 130 and RC 128 by ten and adding 10 ms, providing a range of values from 10-20 ms in 1 ms steps. This coding method is both secure and covert because RGN 130 is shared only by the interrogator and target even though COD 120 is known by all friendlies. Although interception of RGN 130 is unlikely because of the narrow TCOD beam (3 milliradians), any such interception is useless without prior knowledge of COD 120 because RC 128 is not transmitted and both RC 128 and RGN 130 are required to compute delay 134. The open shutter interval that reflects response pulse stream 136 is computed in milliseconds by adding three times the fourth digit of CC to five, giving a range of values from 5 to 32 ms in 3 ms steps.

Thus, the duration of response pulse stream 136 cannot be spoofed without prior knowledge of COD 120 or interception of TCOD 122 and the duration of delay 134 cannot be spoofed without having both the prior knowledge of COD 120 and the successful interception of TCOD 122. Such spoofing also presumes prior knowledge of the decoding algorithms described above. Each transaction is completed within 60 ms. An interrogator may repeat an interrogation as desired to reduce the probability of false negatives. Assuming that interrogation is repeated up to four times before accepting a negative (partial response) result, the entire transaction is completed within 250 ms. This method of obtaining a response is necessary only under extreme scintillation and range conditions, at the limits of link performance.

Figure 20:
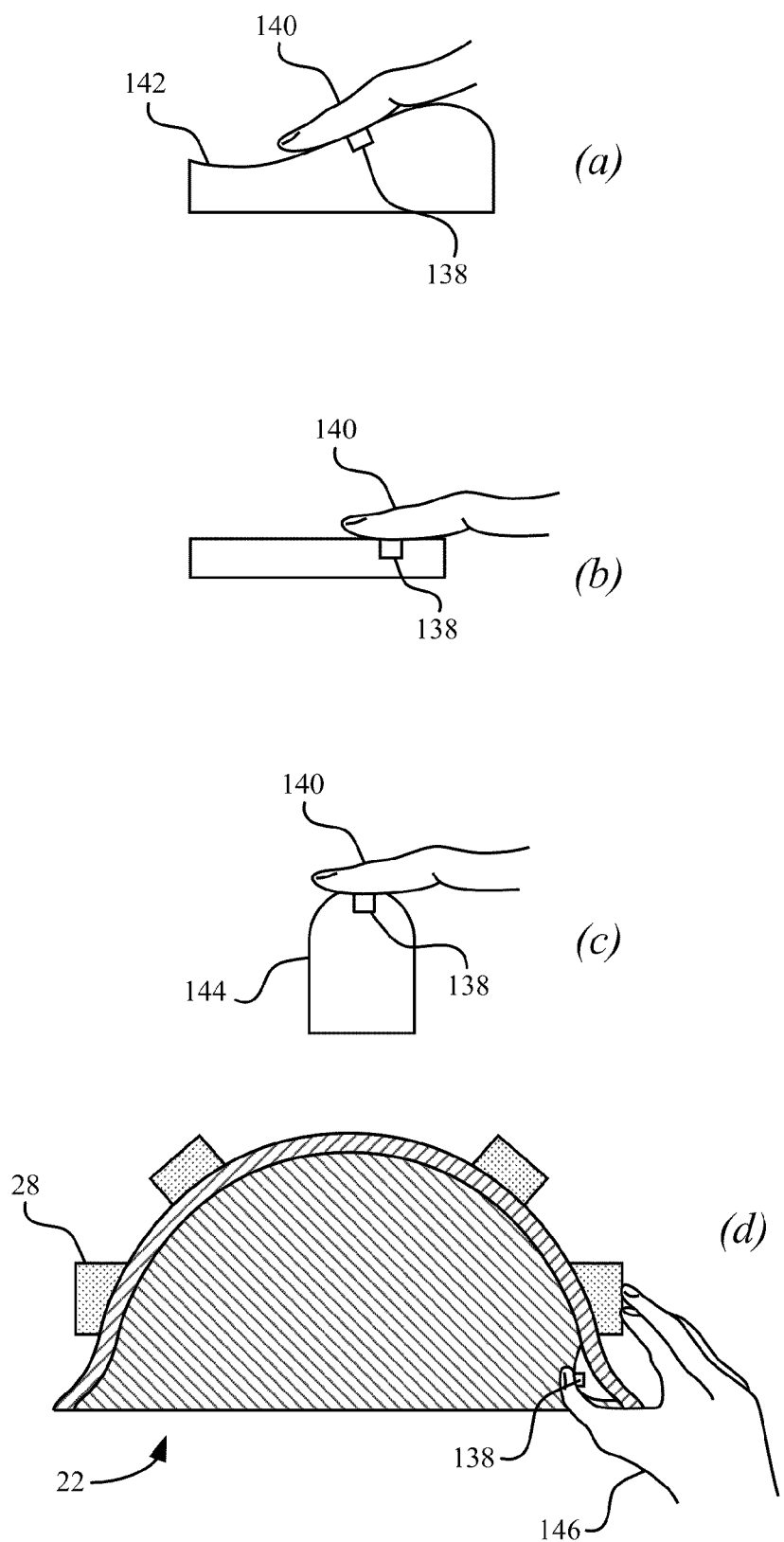
FIGS. 20(a)-(d) are sketches illustrating several examples of means for accepting biometric data employed in a combat response unit of the present invention.

FIGS. 20(*a*)-(*d*) show several examples of suitable means for accepting biometric data for helmet-mounted response unit. One suitable device for accepting biometric fingerprint or thumbprint data is the FCD4B14 FingerChip™ available from AtMel Corporation, San Jose, Calif. As depicted in FIG. 20(*a*), the print sensor 138 is disposed such that a finger 140 may be drawn across print sensor 138 while in continuous contact therewith. Continuous contact is important and is facilitated by providing a curved surface 142 generally as shown. As finger 140 moves over print sensor 138, a stream of digital biometric data is produced by print sensor 138 and presented on a data bus (not shown) for manipulation by microprocessor-controlled logic (not shown). Clearly the exact biometric data stream depends not only on the fingerprint but on the direction and manner in which finger 140 is drawn across print sensor 138. This is an important feature of this invention because it adds considerable security to helmet-mounted response unit in that the availability of the proper finger or thumb alone is insufficient to satisfy the biometric security requirement; the user must also recall and repeat with reasonable accuracy the exact manner in which the thumb or finger was drawn across print sensor 138 when first storing the user's biometric ID data in response unit.

FIG. 20(*b*) shows another mounting arrangement suitable for print sensor 138, although the curved surface 142 is preferable. FIG. 20(*c*) shows yet another example employing the curved surface 144, which importantly permits continuous contact between finger 140 and print sensor 138 while moving thereover.

FIG. 20(*d*) demonstrates an exemplary arrangement for placing print sensor 138 within helmet-mounted response unit so that the user may draw the thumb 146 over print sensor 138 while grasping helmet-mounted response unit 22 preparatory to donning same. Any useful audio and/or visual indicator means (not shown) may be provided to inform the user that helmet-mounted response unit has been successfully activated, thereby affording the opportunity to retry activation by repeating the movement of thumb 146 across print sensor 138. If desired, repeated attempts may be accumulated against a limited number followed by self-destruction of all logic and data stored in helmet-mounted response unit.

In an alternative embodiment of a helmet-mounted response unit, the biometric data necessary to identify several members of a combat unit may be stored in biometric ID storage 66 so that any combat unit member may activate a helmet-mounted response unit. This permits a member of the combat unit to "borrow" the helmet and its response unit from another member of the same combat unit and successfully activate it for use in the battlefield. The size of the group of authorized users is limited only by the memory available in biometric ID storage 66, which may be loaded by mass-transfer of digital data collected from the thumb-scans of all members of the combat unit. Similarly, in an alternative embodiment of an interrogatory unit, the biometric data necessary to identify several members of a combat unit maybe stored in biometric ID storage 114 thereby permitting a member of the combat unit to "borrow" the weapon and response unit from another member of the same combat unit and successfully activate it for use in the battlefield.

Figure 21:
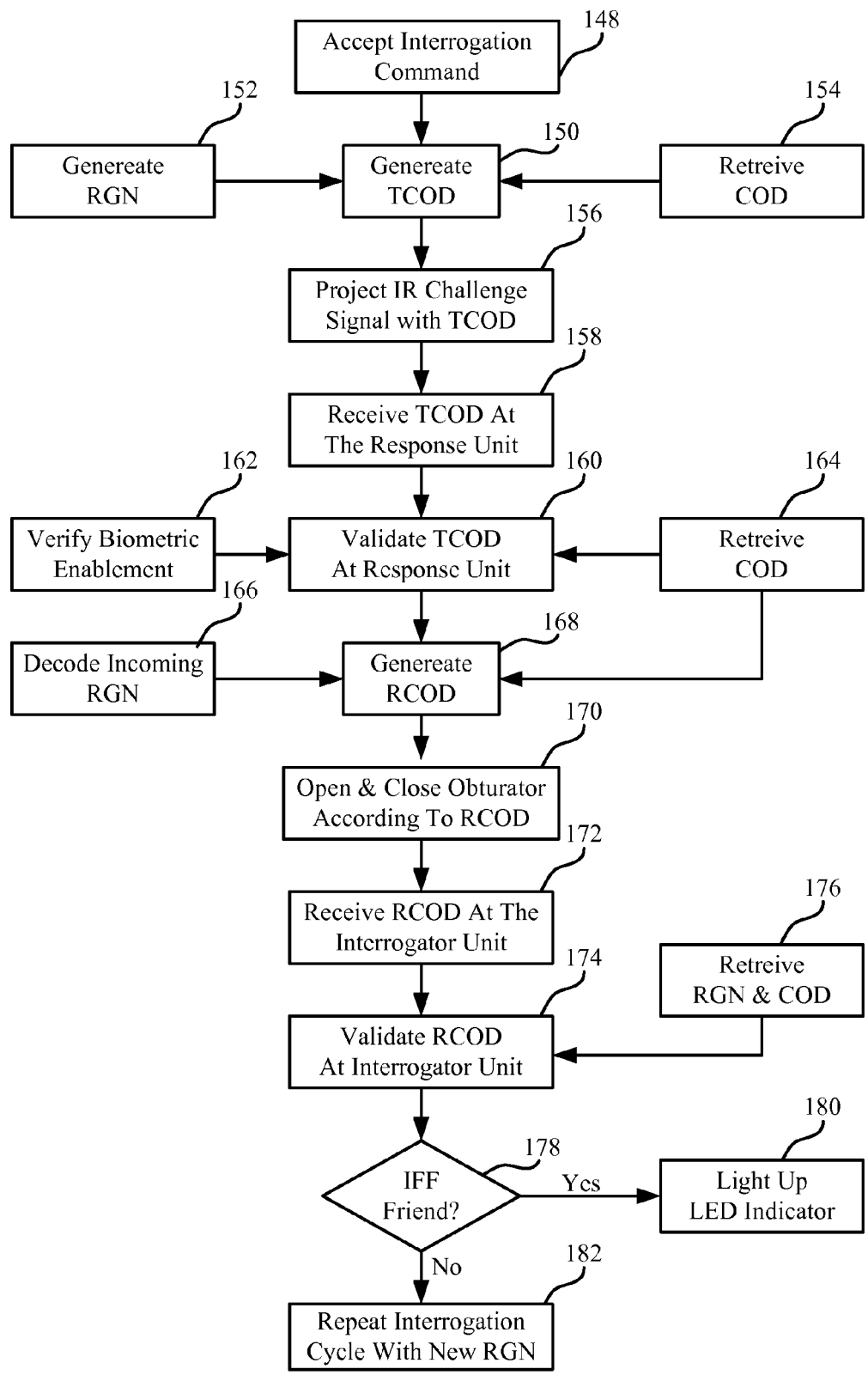
FIG. 21 is a block diagram of a flow chart illustrating a method of this invention.

FIG. 21 is a block diagram showing a flow chart exemplifying the covert communication transaction method of this invention. This process begins with the step 148 where the interrogating soldier triggers an interrogation command at an interrogatory unit. In the step 150, a TCOD is created by accepting the RGN produced in the step 152 and the COD retrieved from local memory in the step 154. In the step 156, an IR transmit signal encoding the TCOD is projected to the targeted response unit. In the step 158, the TCOD is received at the targeted helmet-mounted response unit. More precisely, the 3-pulse frame-synch preamble and the first six symbols of the TCOD are first received and decoded in step 158, which may also include an arrival quadrant indication step (not shown) to notify the helmet wearer by some useful means of the quadrant (Front, Right, Rear, or Left) from which the received TCOD has arrived.

In the step 160, the received TCOD is validated by first verifying that the biometric security has been satisfied in the step 162 and then retrieving from local storage the COD in the step 164. As described above in connection with FIG. 19, the CC (the first four symbols from the COD) is compared with the CC from the received TCOD and, if matched, the next two symbols of the received TCOD are decoded as the RGN in the step 166. In the step 168, the RGN From step 166 and the RC (the fifth and sixth symbols of the COD) are used to compute the closed shutter interval (the delay interval) of the RCOD and the fourth symbol of the COD is used to compute the open shutter interval (the response pulse stream) of the RCOD. In the step 170, the RCOD from step 168 is used to cycle the obturator, thereby retroreflecting the interrogatory pulse stream portion of the TCOD according to the RCOD.

In the step 172, the RCOD is received and decoded at the interrogatory unit and validated in the step 174, which uses the locally-stored RGN and COD retrieved in the step 176 to duplicate thy computations used to create the RCOD at the response unit and to compare the received RCOD with the locally-computed RCOD. In the step 178, the results of step 174 are evaluated to make a friend or foe decision, completing the transaction initiated in step 148. If Friend, then the step 180 signals the interrogatory unit user in some useful manner, such as lighting up an LED for a short time. If Foe, then the step 182 initiates a repetition of the transaction (with a new RGN) or does nothing, thereby indicating that the transaction has failed to identify a friend.

One of ordinary skill in the art would appreciate that, either separately or in concert with the above communication scheme, other data can be modulated on to a signal and received at a receiver unit. Such data can include, but is not limited to, audio, text, and/or images.

Dynamic Optical Tags

Another application of the present invention is in enabling the use of dynamic optical tags (DOTS). As defined by the Defense Advance Research Projects Agency (DARPA), a DOT is preferably a small, thin, environmentally robust, long lived, modulated optical retroreflecting tag working in conjunction with a long range interrogation system. Operationally, DOTS are passive (i.e., in the sleep mode) and are only activated when interrogated. When active, a DOT modulates an illuminating beam to transmit coded information onto a retro-reflecting path. Preferably, a DOT is non-RF to avoid depending upon radio frequencies that can be detected by the tagged target or by third parties in the area of the emitter.

When affixed to an object, a DOT provides a tracking entity the ability to uniquely identify and locate the object. As the object on which the tag is mounted moves through a region, the DOT can record location information (via a global positioning satellite receiver), imagery, temperature, pressure, audio, and other data that can provide information about the object, the conditions under which it was subjected, its location and its state.

In one embodiment, a DOT is a retroflector/obturator capable of rapid modulation is used, such as a Tech Spec™ Corner Cube Retroreflector (Trihedral Prisms) available from Edmond Industrial Optics, Barrington, N.J. The obturator portion of retroreflector/obturator may include a mechanical shutter device capable of cycling open and closed within a few milliseconds, or more preferably, a liquid crystal device (LCD) disposed over the retroreflector portion, such as the LCD-CDS921 06 available from Cubic Defense Systems, San Diego, Calif.

As previously shown in FIG. 9, one embodiment of a DOT can comprise of a base station 901, a transceiver 902 for transmitting 903 and receiving 904 interrogation pulse, a remote station 905, an electronic driver 906 and a polymer dispersed liquid crystal 907. The turn-on or switch-on time is influenced by the applied voltage level and by the thickness of the liquid crystal layer. The voltage levels are preferably in the range of CMOS voltages. The retroreflector 908 is arranged behind the liquid crystal modulator 907. The polymer-dispersed liquid crystal 907 as mentioned above maintains the bistable state of ON and OFF and acts as an obturator for interrogation pulse stream 903 by blocking and allowing laser signals to pass through the crystal 907. The shuttering of the polymer-dispersed liquid crystal is controlled by the obturator signal provided by the electronic driver 906 capable of delivering voltages corresponding to the input signal 908. The input signal can be any pulse signal preferably pulse position or pulse width pulses. Preferably, a DOT used in the present invention is not larger than 25 mm×25 mm×5 mm; operates in an environment ranging from minus 70 Celsius to 45 degrees Celsius; has an angle of regard of plus or minus 60 degrees or greater; and modulates at least 100 kbits/sec. To the extent the liquid-crystal chosen does not effectively operate in low temperatures, one of ordinary skill in the art would appreciate that a heating element, as previously described, could be incorporated to enable effective operation of the liquid-crystal system.

Information stored by, or within, a DOT can be remotely read using the present invention. Referring back to FIG. 1, a functional block diagram of the interrogator system 100 of the present invention is shown. The system 100 comprises a laser 110, an optical transmitter 120, an optical receiver 130, a light sensitive detector 140, a change-over and a correlator module 150. The correlator module 150 further comprises a clock signal generator 165 that provides working clock signals to an analog-to-digital converter 170, a counter 160 for addressing and sequencing a memory module 155 and a processing unit 175. The memory module 155 stores digitized values of a sequence of transmission pulses s(t), for triggering the laser 110, as well as reception pulses r(t) outputted from the detector 140 and digitized by the analog-to-digital converter 170.

Referring to FIG. 4, a visual representation of one embodiment of the system is shown. A laser emits optical signals through a collimator 410 which collimates the beam for subsequent transmission through a laser aperture 405. Power is supplied to the unit by battery 480. The system further comprises a HV supply 430, an analog board 440, an APD receiver module 450, a receiver lens and filter assembly 460 and a receiver aperture 470 into which reflected optical signals are received. The resulting range is depicted on a range display 420.

Operationally, an aircraft is tracking a tagged cargo container and a tagged tank. In operation, a tag is placed on both the container and tank. The tag is a modulating dynamic optical tag that is small, thin and retroreflecting. The tag remains in passive mode (sleep mode) for most of its operation and it is activated when interrogated by a high pulse laser beam, preferably emitted from the tracking aircraft. The tag then starts modulating the illuminating beam to transmit coded information, such as stored data detailing temperature, time, pressure, movement, location, and other characteristics, on the retro-reflecting path for identification and range finding in accordance with the principles of the present invention. The interrogator system then further transmits and/or displays acquired data, including range from the object, temperature, time, pressure, movement, location, and other characteristics. Preferably, the interrogator system supports a communication range of 1 kilometer or greater, uses less than 800 watts of prime power, and weighs less than 25 kilograms. More preferably, an airborne interrogator supports greater than 10 Km range at communication rates greater than 100 Kbps.

Dynamic Optical Tag enabled optical communication system of the present invention results in a small, thin, environmentally robust, modulated optical retroreflecting tag and a long-range interrogation system. In addition, this enables highly precise tag location along with reliable and efficient information flow between the tags and the interrogation device operating in non-RF and visually non-alerting mode.

Terra Hertz Operational Reachback

Another embodiment of the present optical communications system may be applied to achieving the objectives of DARPA's Terra Hertz Operational Reachback, THOR, program, thereby overcoming the disadvantages of conventional communication systems. THOR attempts to create a mobile, free space, optical network having data transfer rates of 10 gigabits per second and an aircraft to aircraft link distance of approximately 400 kilometers.

An optical communications system implementing THOR uses aerial optical transmissions to establish a link that extends from, a terrestrial point of presence to an underwater vehicle via an aircraft or spacecraft surrogate with an air to air relay link so as to track target objects such as tanks, aircrafts, forces, ships, subsurface vehicles etc. In operation, target objects have the retroreflectors attached therewith. Interrogation signals from aircraft, preferably high pulse rate laser signals, are modulated-reflected by the retroreflector back to the aircraft for identification and range finding in accordance with the principle of the present invention. THOR, unlike GPS systems, does not get jammed during warfare, clouds or turbulences.

The above examples are merely illustrative of the many applications of the system of present invention. Although only a few embodiments of the present invention have been described herein, it should be understood that the present invention might be embodied in many other specific forms without departing from the spirit or scope of the invention. For example, other configurations of combat identifications, secure covert operation, dynamic optical tags, and terra hertz operational reachback can also be considered. Therefore, the present examples and embodiments are to be considered as illustrative and not restrictive, and the invention is not to be limited to the details given herein, but may be modified within the scope of the appended claims.

What is claimed is:

1. A system for communicating information from a first entity toward a second entity using focused laser light, the laser system comprising:
a processor configured to provide a coded pulse sequence;
a laser communicatively coupled with the processor and being configured to generate a plurality of transmission pulses corresponding with the coded pulse sequence modulated by a first data signal; and
an optical transmission system being configured to direct the transmission pulses emitted by the laser toward a the second entity as a beam of light in free space, wherein the optical transmission system is capable of illuminating the second entity at a distance of at least 1 kilometer from a laser; and
an optical receiver system being configured to receive reflected transmission pulses modulated with a second data signal.

2. The laser system of claim 1 wherein the laser is a fast pulsed laser.

3. The laser system of claim 1 further comprising memory configured to store coded pulse sequences, wherein the processor provides coded pulse sequences to the laser by retrieving the pulse sequence from memory.

4. The laser system of claim 1 wherein the laser is any one of a mode-locked visible-range titanium-doped sapphire laser, Kerr lens mode-locked laser, polarization-sensitive mode-locked fiber laser, or actively mode-locked laser.

5. The laser system of claim 1 further comprising:
a light sensitive detector;
a change-over module; and
a correlator module.

6. The laser system of claim 1 wherein the laser generates a plurality of transmission pulses at fast rates and wherein the laser is triggered by coded pulse sequences read out from a memory at a predetermined clock frequency.

7. The laser system of claim 6 wherein the coded pulse sequence for triggering the laser is of a pseudo random binary type.

8. The laser system of claim 6 wherein the coded pulse sequence for triggering the laser is encoded using a Maximal Length Sequence.

9. A method of determining range of a target object, comprising the steps of:
generating transmission pulses at fast rates, the pulses capable of illuminating the target at a distance of at least 1 kilometer from a laser, by triggering the laser using coded pulse sequences read out from a memory at a predetermined clock frequency and modulated by a first data signal;
storing the coded pulse sequences for triggering the laser;
focusing the transmission pulses toward a target object as a light beam in free space using the laser; and
receiving reflected transmission pulses modulated with a second data signal.

10. The method of claim 9 wherein said focusing of the transmissions pulses, provides the light beam with a beam divergence of less than about 6 milliradians.

11. A communication method using a laser system, comprising:
generating transmission pulses at fast rates, the pulses capable of illuminating a target at a distance of at least 1 kilometer from a first entity, by
triggering a laser using coded pulse sequences read out from a memory at a predetermined clock frequency; and
modulating a first set of data onto said coded pulse sequences; and
focusing the transmission pulses for transmission through free space from the first entity toward a second entity using the laser;
receiving at least a portion of the transmission pulses, wherein the transmission pulses are modulated with a second set of data.

12. The method of claim 11 wherein the focusing focuses the transmission pulse as a light beam with a beam divergence less than or equal to about 6 milliradians.

13. The method of claim 11 wherein said first set of data, second set of data, or both includes any one of audio, video, text, or image data.

14. The method of claim 11 wherein the laser is any one of a mode-locked visible-range titanium-doped sapphire laser, Kerr lens mode-locked laser, polarization-sensitive mode-locked fiber laser, or actively mode-locked laser.

15. An interrogator system for communicating information from a first entity toward a second entity using focused laser light, the system comprising:
a laser configured to illuminate a target with a collimated laser light beam, the laser capable of illuminating a target at a distance of at least 1 kilometer from the first entity;
means for providing transmission pulses with coded pulse sequences to the collimated laser light beam;
modulating means for modulating a first data signal onto the transmission pulses;
focusing means for directing the collimated laser light beam through free space toward the second entity; and
means for receiving reflected transmission pulses modulated with a second data signal.

16. The interrogator system according to claim 15 further comprising
a sensor configured to receive an optical signal from the second entity; and
a processor communicatively coupled with the sensor and configured to determine the range between the interrogator system and the second entity.

17. The interrogator system according to claim 15 further comprising
a sensor configured to receive an optical signal from the second entity; and
a processor communicatively coupled with the sensor and configured to determine the identity of the second entity from the transmission pulses received from the second entity.

* * * * *

UNITED STATES PATENT AND TRADEMARK OFFICE
CERTIFICATE OF CORRECTION

| | | |
|---|---|---|
| PATENT NO. | : 7,983,565 B2 | Page 1 of 1 |
| APPLICATION NO. | : 12/332200 | |
| DATED | : July 19, 2011 | |
| INVENTOR(S) | : Deepak Varshneya et al. | |

It is certified that error appears in the above-identified patent and that said Letters Patent is hereby corrected as shown below:

In column 25, lines 13-14, claim 1, please replace:

"a the second entity"

with

--the second entity--

Signed and Sealed this
Eighth Day of November, 2011

David J. Kappos
*Director of the United States Patent and Trademark Office*